United States Patent
Wada

(10) Patent No.: US 7,889,436 B2
(45) Date of Patent: Feb. 15, 2011

(54) ZOOM LENS AND CAMERA HAVING THE SAME

(75) Inventor: Ken Wada, Sakura (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/618,971

(22) Filed: Nov. 16, 2009

(65) Prior Publication Data

US 2010/0123956 A1    May 20, 2010

(30) Foreign Application Priority Data

Nov. 19, 2008 (JP) ............................. 2008-295807
Sep. 9, 2009 (JP) ............................. 2009-208194

(51) Int. Cl.
*G02B 15/14* (2006.01)
(52) U.S. Cl. ..................... 359/676; 359/678; 359/684
(58) Field of Classification Search ................ 359/676, 359/678, 682–684, 695, 726–729
See application file for complete search history.

(56) References Cited

U.S. PATENT DOCUMENTS 7,426,085 B2    9/2008    Yoshitsugu et al.
2008/0080062 A1    4/2008    Ito

FOREIGN PATENT DOCUMENTS

JP    2004-102089 A    4/2004

*Primary Examiner*—Alicia M Harrington
(74) *Attorney, Agent, or Firm*—Canon U.S.A., Inc. I.P. Division

(57) ABSTRACT

A zoom lens includes, in order from an object side to an image side, a first lens unit having a positive refractive power, a second lens unit having a negative refractive power, a reflection unit including a reflection surface for bending an optical path, a third lens unit having a negative refractive power, a fourth lens unit having a positive refractive power, and a fifth lens unit having one of a positive refractive power and a negative refractive power. In the zoom lens, at least the second lens unit and the fourth lens unit move during zooming while the reflection unit remains stationary. In addition, a focal length of the first lens unit and respective focal lengths of the zoom lens at a wide-angle end and at a telephoto end are appropriately set.

7 Claims, 16 Drawing Sheets

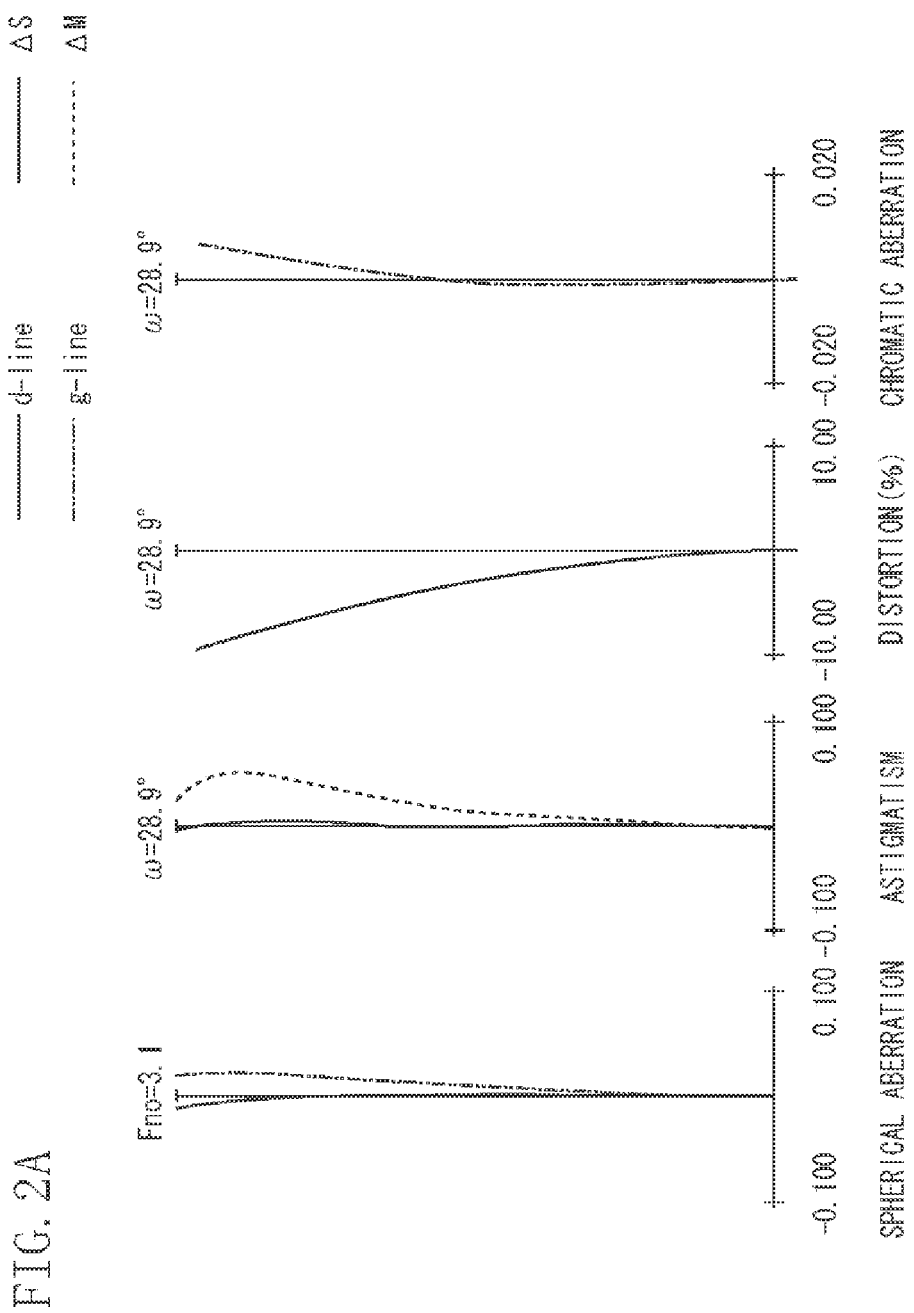

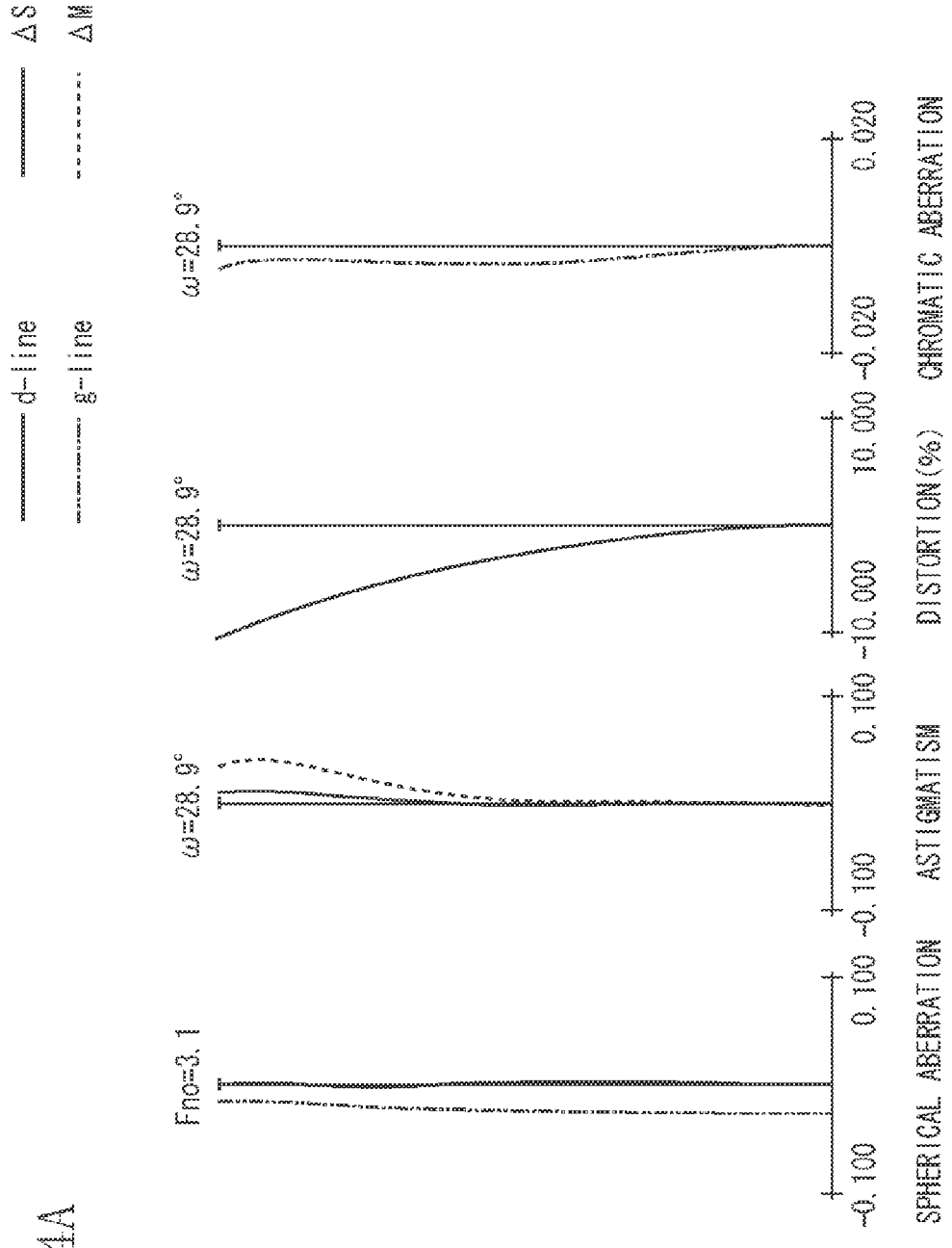

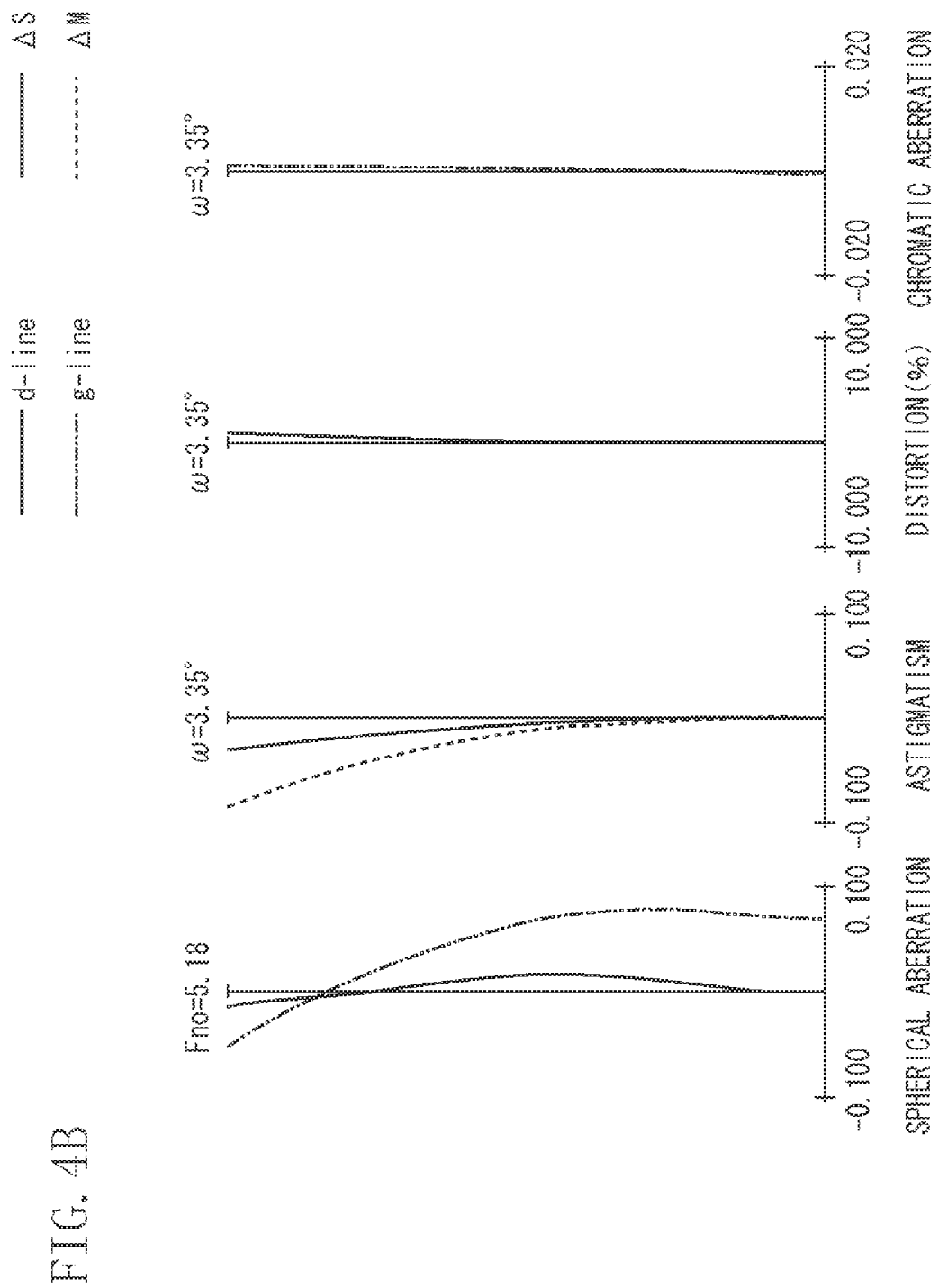

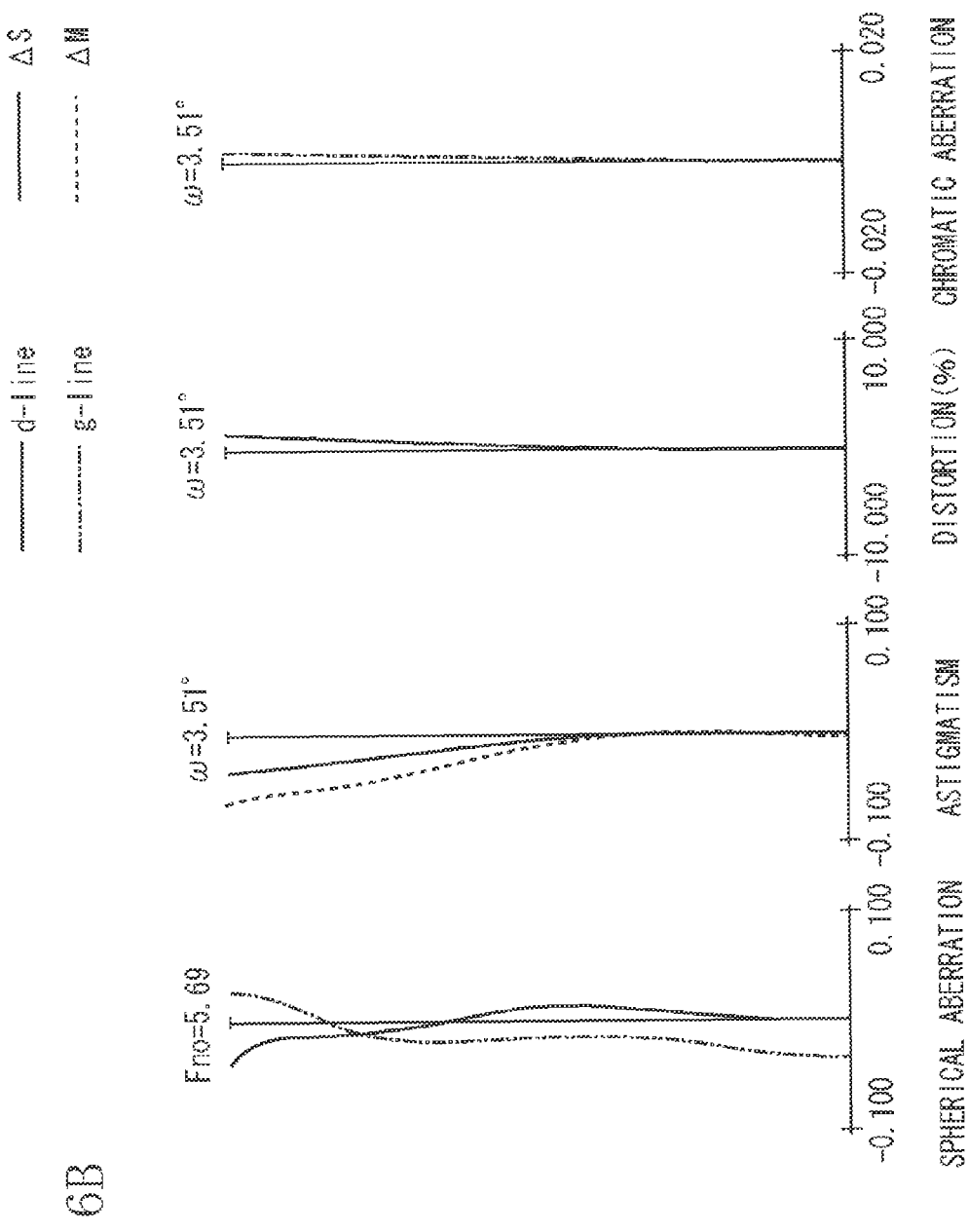

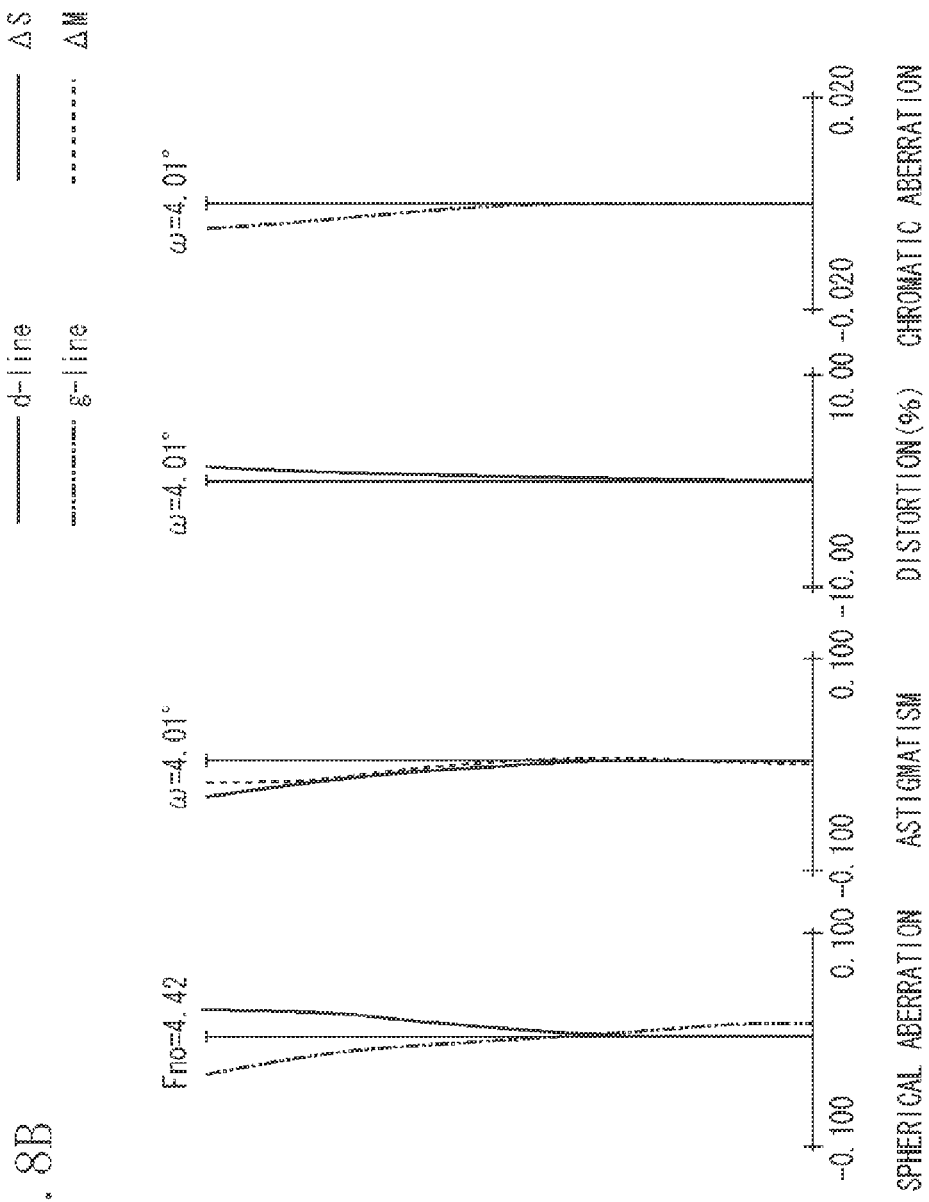

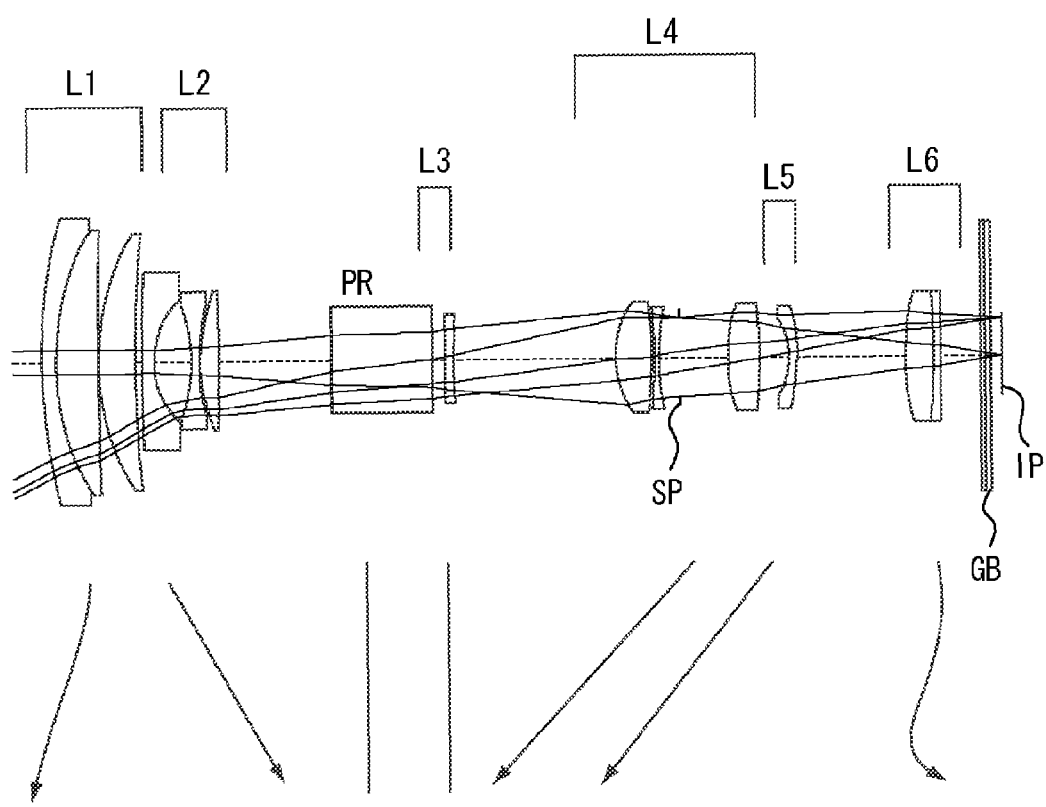

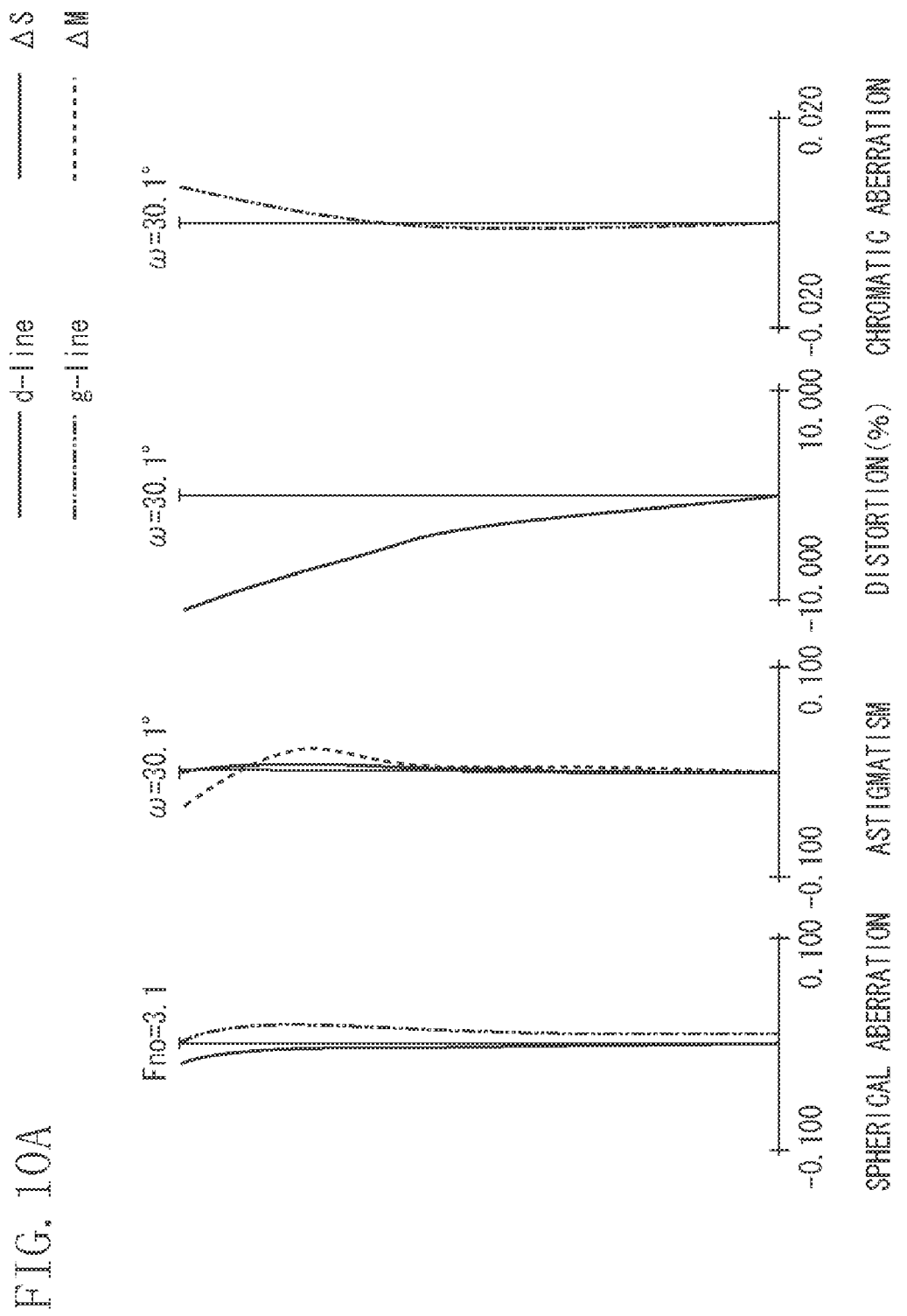

ZOOM LENS AND CAMERA HAVING THE SAME

BACKGROUND OF THE INVENTION

1. Field of the Invention

The present invention relates to a zoom lens. More specifically, the present invention relates to a zoom lens useful as a photographic optical system for a digital still camera.

2. Description of the Related Art

It is desired by the market that a photographic optical system used in an image pickup apparatus that uses a solid-state image sensor is a small-size zoom lens having a high zoom ratio. In order to implement a small-size camera using a zoom lens having a high zoom ratio, a conventional retractable type zoom lens is widely used that reduces the distance between lens units, when shooting is not executed, to a distance different from that during shooting and retracts the zoom lens into a camera body.

U.S. Patent Application Publication No. US 2008/0080062 and Japanese Patent Application Laid-Open No. 2004-102089 discuss an optical-path-bending type zoom lens that uses a prism having a reflection surface to bend an optical path of a photographic optical system, which is effective in reducing the thickness (the total front-to-back dimension) of a camera.

U.S. Pat. No. 7,426,085 discusses a hybrid type zoom lens between the retractable type zoom lens and the optical-path-bending type zoom lens, in which a lens unit located at a position closer to the object side than a reflection unit into a space that is generated by moving a reflection unit, such as a prism. Hereinbelow, the above-described hybrid type zoom lens is referred to as an "optical-path-bending retractable type zoom lens".

In the zoom lens discussed in U.S. Patent Application Publication No. US 2008/0080062 and Japanese Patent Application Laid-Open No. 2004-102089, a second lens unit includes a reflection unit. Accordingly, the second lens unit does not move during zooming (for zooming). Furthermore, a first lens unit greatly moves during zooming. Thus, the zoom lens discussed in U.S. Patent Application Publication No. US 2008/0080062 and Japanese Patent Application Laid-Open No. 2004-102089, a second lens unit achieves a high zoom ratio. However, because the refractive power of the first lens unit is small, the moving amount of the lens units during zooming may become very great, which makes it difficult to reduce the thickness of the camera.

The optical-path-bending retractable type zoom lens discussed in U.S. Pat. No. 7,426,085 can reduce the thickness of the camera while achieving a high zoom ratio. However, because the optical-path-bending retractable type zoom lens discussed in U.S. Pat. No. 7,426,085 moves a lens unit located at a position closer to the object side than the reflection unit, it is necessary to design its optical system appropriate for the retraction of the reflection unit and the movement of the lens unit.

However, an optical system in which the first lens unit is greatly moved during zooming is not very mechanically useful. Furthermore, if an optical system like this is used, it becomes difficult to reduce the thickness of the camera while achieving a high zoom ratio.

More specifically, in order to retract a lens unit located at a position closer to the object side than the reflection unit while retracting the reflection unit, it becomes necessary to provide a large cutout to a cam tube for moving the lens unit located closer to the object side than the reflection unit to appropriately retract the reflection unit.

If the cutout like this is provided, it becomes difficult or impossible to secure a sufficiently large rotational angle of the cam tube. Accordingly, the first lens unit cannot be greatly moved during zooming.

SUMMARY OF THE INVENTION

According to an aspect of the present invention, a zoom lens includes, in order from an object side to an image side, a first lens unit having a positive refractive power, a second lens unit having a negative refractive power, a reflection unit including a reflection surface for bending an optical path, a third lens unit having a negative refractive power, a fourth lens unit having a positive refractive power, and a fifth lens unit having one of a positive refractive power and a negative refractive power. In the zoom lens, during zooming from a wide-angle end to a telephoto end, at least the second lens unit and the fourth lens unit move while the reflection unit remains stationary. In addition, in the zoom lens, a focal length of the first lens unit (f1) and respective focal lengths of the zoom lens at the wide-angle end and at the telephoto end (fw, ft) satisfy the following condition:

$$0.7 < f1/\sqrt{fw \cdot ft} \leq 1.7.$$

According to another aspect of the present invention, a zoom lens having a high zoom ratio, which is effective in reducing the thickness of a camera using the zoom lens, can be implemented.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 2A and 2B are aberration charts of the first exemplary embodiment of the present invention.

FIGS. 4A and 4B are aberration charts of the second exemplary embodiment of the present invention.

FIGS. 6A and 6B are aberration charts of the third exemplary embodiment of the present invention.

FIGS. 8A and 8B are aberration charts of the fourth exemplary embodiment of the present invention.

FIG. 9 is a lens cross section of a fifth exemplary embodiment of the present invention.

FIGS. 10A and 10B are aberration charts of the fifth exemplary embodiment of the present invention.

DESCRIPTION OF THE EMBODIMENTS

Figure 1:
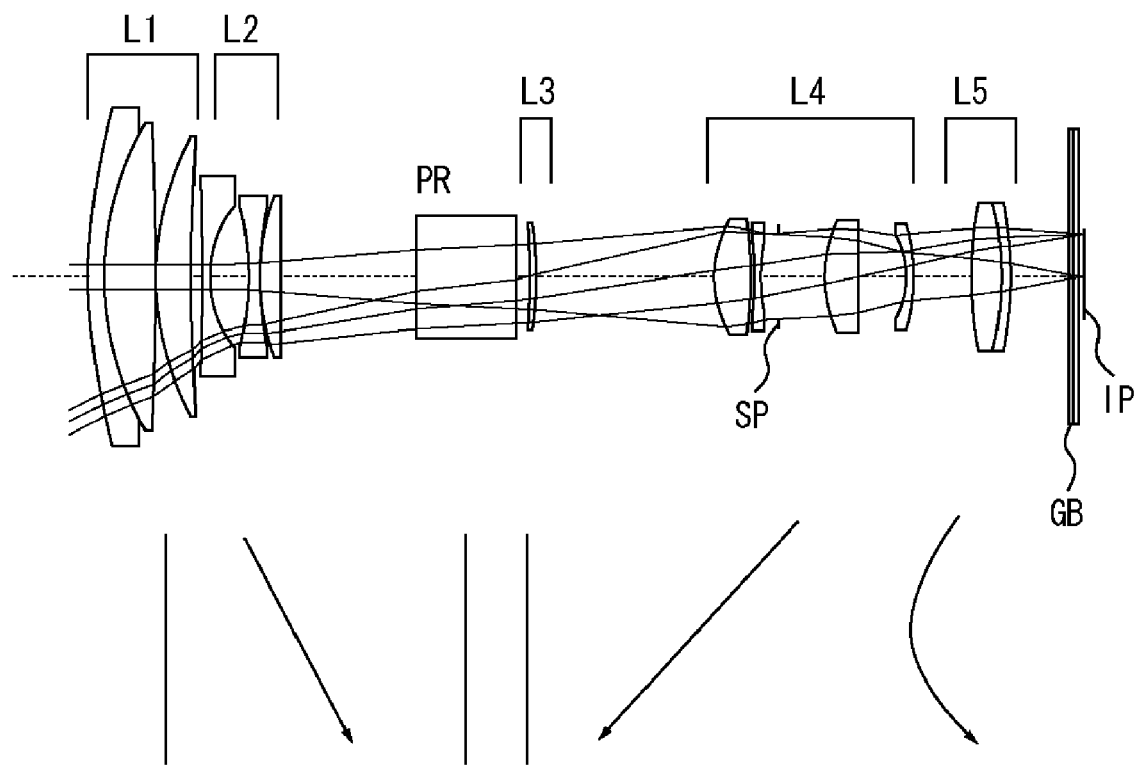
FIG. 1 is a lens cross section of a first exemplary embodiment of the present invention.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., aberration), a reduction of the error and/or a correction of the error is intended.

Figure 11A:
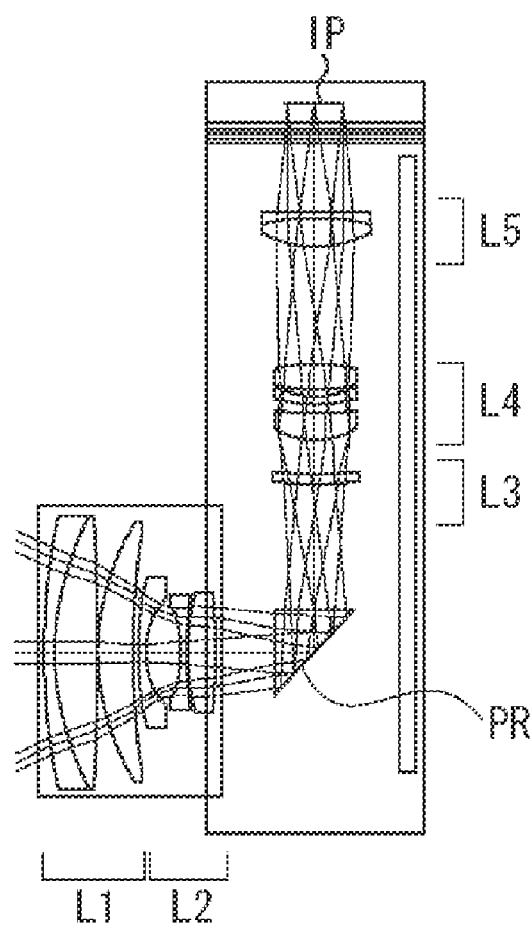
FIGS. 11A and 11B illustrate an example of an image pickup apparatus (image taking apparatus) that uses the zoom lens according to an exemplary embodiment of the present invention.
Figure 11B:
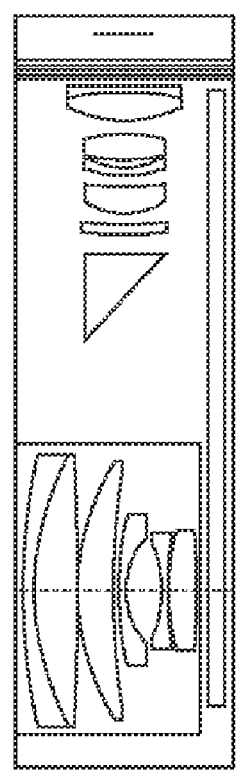

FIGS. 11A and 11B illustrate an example of a digital still camera (an image pickup apparatus, an image taking apparatus) having a zoom lens according to an exemplary embodiment of the present invention. More specifically, FIG. 11A illustrates an example of a state of the digital still camera during shooting. FIG. 11B illustrates an example of a state of the digital still camera when the zoom lens is retracted (zoom lens-retracted state).

Referring to FIGS. 11A and 11B, a first lens unit L1 has a positive refractive power (optical power=the reciprocal of the focal length) and a second lens unit L2 has a negative refractive power. "PR" denotes a prism, which is a reflection unit, including a reflection surface for bending an optical path. A third lens unit L3 has a negative refractive power. A fourth lens unit L4 has a positive refractive power. A fifth lens unit L5 has a positive or negative refractive power.

It is also useful if the zoom lens includes a sixth lens unit having a positive refractive power, which is located closer to an image side of the fifth lens unit. "IP" denotes a solid-state image sensor (photoelectric conversion element), such as a charge-coupled device (CCD) sensor or a complementary metal oxide semiconductor (CMOS) sensor, that receives an image formed by the zoom lens.

In the zoom lens according to each exemplary embodiment of the present invention, during zooming from the wide-angle end to the telephoto end, at least the second lens unit L2 and the fourth lens unit L4 move while the reflection unit PR does not move (remains stationary).

By providing the reflection unit PR, which remains stationary during zooming as described above, each exemplary embodiment of the present invention can effectively utilize a space within a body of the camera, which is generated by bending the optical path of the zoom lens. Accordingly, each exemplary embodiment of the present invention can implement a zoom lens having a high zoom ratio and whose total length is short.

Furthermore, in each exemplary embodiment of the present invention, the first lens unit L1 having a positive refractive power is located closest to the object side and at least the second lens unit L2 and the fourth lens unit L4 move during zooming. Accordingly, each exemplary embodiment can achieve a high zoom ratio.

In particular, each exemplary embodiment can increase the positive refractive power of the fourth lens unit L4, which moves during zooming in a great moving amount, by using the third lens unit L3 having a negative refractive power.

As described above, each exemplary embodiment can achieve a high zoom ratio by using the lens unit located closer to the image side than the prism PR, which is assigned with a high variable magnification performance. In addition, the zoom lens according to each exemplary embodiment can reduce the thickness of the camera by using the first lens unit L1 and the second lens unit L2, which are assigned with a relatively low variable magnification performance. More specifically, according to each exemplary embodiment of the present invention, a zoom lens having a high overall zoom ratio can be implemented even if the first lens unit L1 remains stationary or moves in a small moving amount during zooming.

Furthermore, in the zoom lens according to each exemplary embodiment of the present invention, a focal length of the first lens unit L1 (f1) and respective focal lengths of the entire optical system (zoom lens) at the wide-angle end and at the telephoto end (fw, ft) satisfy the following condition:

$$0.7 < f1/\sqrt{fw \cdot ft} \leq 1.7 \tag{1}.$$

The condition (1) provides a condition for setting a relatively great value for the refractive power of the first lens unit L1. In each exemplary embodiment, which uses the first lens unit L1 having the relatively great refractive power, the first lens unit L1 and the second lens unit L2 can move in a small moving amount during zooming. Accordingly, each exemplary embodiment can implement a zoom lens useful in reducing the thickness of the camera.

If the lower limit value of the condition (1) is exceeded, then the refractive power of the first lens unit L1 becomes very great. Accordingly, in this case, the thickness of a positive lens included in the first lens unit L1 becomes great. On the other hand, if the upper limit value of the condition (1) is exceeded, then the refractive power of the first lens unit L1 becomes very small. Accordingly, in order to achieve a desired high zoom ratio, the moving amount of the lens unit becomes great. Therefore, in this case, a zoom lens effective in reducing the thickness of the camera cannot be implemented.

It is further useful if the following condition (1a) is satisfied. By satisfying in the condition (1a), in particular, the thickness of the camera can be designed relatively small.

$$1.0 < f1/\sqrt{fw \cdot ft} \leq 1.7 \tag{1a}.$$

Now, a useful exemplary configuration of the zoom lens according to each exemplary embodiment the present invention will be described in detail below.

In each exemplary embodiment, in shifting from the shooting state (FIG. 11A) to the lens-retracted state (FIG. 11B), it is useful if the reflection unit (prism) PR moves in a direction perpendicular to an optical axis of the first lens unit L1 and the second lens unit L2 and if the first lens unit L1 and the second lens unit L2 retract into a space generated by moving the prism PR.

By employing the above-described optical-path-bending retractable type zoom lens, each exemplary embodiment can implement a zoom lens useful in reducing the thickness of a camera.

As described above, in order to retract the first lens unit L1 and the second lens unit L2 while retracting the prism PR, it is necessary to provide a great cutout (opening), which is used for retracting the prism PR, to a cam tube. Accordingly, it becomes difficult to provide a cam groove used for moving the first lens unit L1 during zooming.

In order to address this issue, it is useful to move the second lens unit L2 in a moving amount greater than that of the first lens unit L1 instead of keeping the first lens unit L1 stationary or moving the first lens unit L1 in a small moving amount during zooming.

Because the second lens unit L2 is smaller in size and lighter in weight compared with the first lens unit L1, a drive mechanism including a small-size drive source, such as a stepping motor, and a feed screw can be provided around the second lens unit L2. Accordingly, the second lens unit L2 can be moved without employing a drive mechanism provided on the cam tube.

With the above-described configuration, each exemplary embodiment can implementation an optical-path-bending retractable type zoom lens easy to manufacture and operate.

In the zoom lens according to each exemplary embodiment of the present invention, it is useful if the amount of movement of the first lens unit L1 (M1) during zooming from the wide-angle end to the telephoto end (a negative value indicates the amount of movement towards the object side) satisfies the following condition (2):

$$-0.5 < M1/\sqrt{fw \cdot ft} < 0.2 \quad (2).$$

If the lower limit value of the condition (2) is exceeded and if the first lens unit L1 is greatly moved towards the object side, the length of the cam tube for moving the first lens unit L1 becomes long although it is useful in increasing the zoom ratio. Accordingly, it becomes difficult to reduce the thickness of the camera. On the other hand, if the upper limit value of the condition (2) is exceeded, then it becomes difficult to achieve a desired high zoom ratio.

It is also useful, in implementing a zoom lens further effective in reducing the thickness of the camera and having a configuration further useful in achieving a high zoom ratio, if the amount of movement of the first lens unit L1 (M1) during zooming from the wide-angle end to the telephoto end satisfies the following condition (2a):

$$-0.45 < M1/\sqrt{fw \cdot ft} < 0.15 \quad (2a).$$

It is further useful, in achieving a high zoom ratio, if the first lens unit L1 is moved towards the object side so that the amount of movement of the first lens unit L1 (M1) during zooming satisfies the following condition (2b):

$$-0.45 < M1/\sqrt{fw \cdot ft} < 0 \quad (2b).$$

In the zoom lens according to each exemplary embodiment of the present invention, it is useful if a focal length of the fourth lens unit L4 (f4) satisfies the following condition (3):

$$0.4 < f4/\sqrt{fw \cdot ft} < 1.5 \quad (3).$$

The condition (3) provides a condition for appropriately setting the focal length of the fourth lens unit L4. If the lower limit value of the condition (3) is exceeded, then the refractive power of the fourth lens unit L4 becomes very great. Accordingly, the number of necessary positive lenses increases. Therefore, it becomes difficult to reduce the thickness of the camera. On the other hand, if the upper limit value of the condition (3) is exceeded, then the refractive power of the fourth lens unit L4 becomes very small. Accordingly, it becomes difficult to achieve a desired zoom ratio.

It is further useful, in implementing a zoom lens further effective in reducing the thickness of the camera and having a configuration further useful in achieving a high zoom ratio, if the focal length of the fourth lens unit L4 (f4) satisfies the following condition (3a):

$$0.6 < f4/\sqrt{fw \cdot ft} < 1.3 \quad (3a).$$

In the zoom lens according to each exemplary embodiment of the present invention, it is useful if the focal length of the fourth lens unit L4 (f4) and a focal length of the third lens unit L3 (f3) satisfy the following condition (4):

$$0.0 < f4/|f3| < 0.4 \quad (4).$$

The condition (4) provides a condition for appropriately setting a ratio of the focal length of the third lens unit L3 and that of the fourth lens unit L4. If either the upper limit value or the lower limit value of the condition (4) is exceeded, then the refractive power of the third lens unit L3 or the fourth lens unit L4 becomes very great. Accordingly, in this case, a desired zoom ratio cannot be achieved or the size of the camera increases because the number of necessary lenses increases.

It is further useful, in implementing a zoom lens further effective in reducing the thickness of the camera and having a configuration further useful in achieving a high zoom ratio, if the focal length of the fourth lens unit L4 (f4) and the focal length of the third lens unit L3 (f3) satisfy the following condition (4a):

$$0.0 < f4/|f3| < 0.25 \quad (4a).$$

In the zoom lens according to each exemplary embodiment of the present invention, the second lens unit L2 includes at least one negative lens and at least one positive lens. It is useful if respective average Abbe numbers of the at least one negative lens and the at least one positive lens (vn, vp) satisfy the following condition:

$$1.5 < vn/vp < 5.0 \quad (5).$$

The condition (5) provides a condition for appropriately setting a ratio of the average Abbe numbers of the at least one negative lens and the at least one positive lens included in the second lens unit L2.

If the second lens unit L2 includes one negative lens and one positive lens, the average Abbe numbers of the at least one negative lens and the at least one positive lens (vn, vp) are equivalent to the Abbe numbers of the one negative lens and the one positive lens, respectively.

If the lower limit value of the condition (5) is exceeded, then it becomes difficult to correct chromatic aberration that may occur within the second lens unit L2. Accordingly, a large amount of variation of aberration may occur during zooming.

On the other hand, if the upper limit value of the condition (5) is exceeded, then it becomes necessary to employ a material having a low refractive index for the negative lens. Therefore, it becomes difficult to reduce the thickness of the camera.

It is further useful, in implementing a zoom lens further effective in reducing the thickness of the camera, if the condition (5a) is satisfied:

$$1.9 < vn/vp < 3.0 \quad (5a).$$

Now, the zoom lens according to each exemplary embodiment of the present invention will be described in detail below with reference to drawings.

Figure 2B:
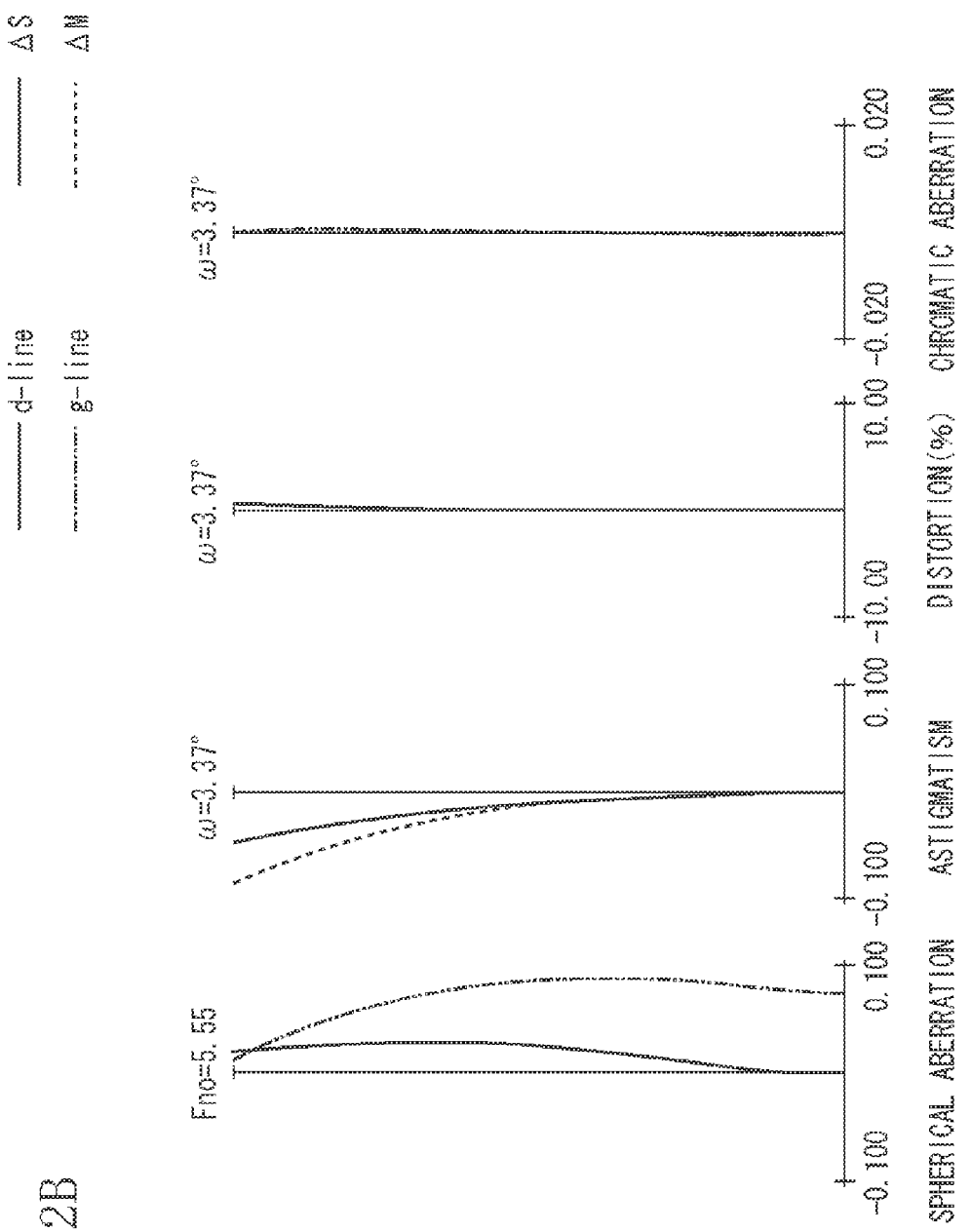

FIG. 1 is a lens cross section of a first exemplary embodiment of the present invention at the wide-angle end. FIGS. 2A and 2B are aberration charts of the zoom lens according to the first exemplary embodiment of the present invention at the wide-angle end and at the telephoto end, respectively.

Figure 3:
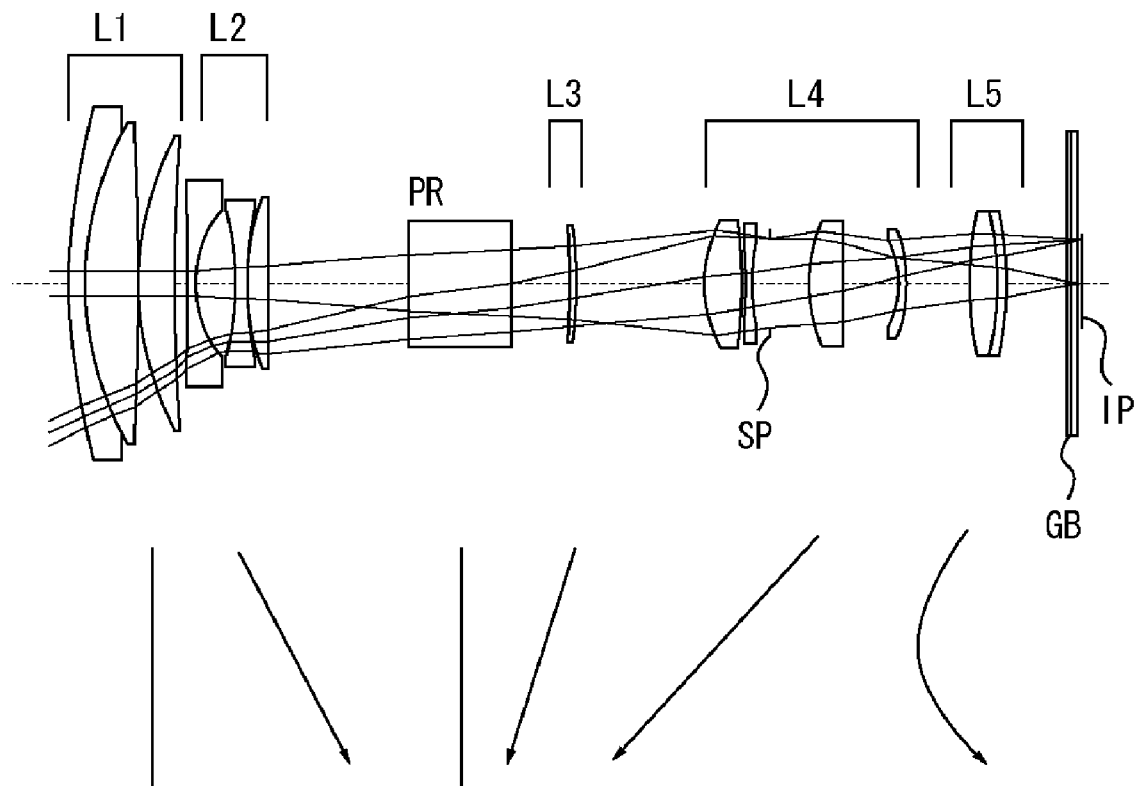
FIG. 3 is a lens cross section of a second exemplary embodiment of the present invention.

FIG. 3 is a lens cross section of a second exemplary embodiment of the present invention at the wide-angle end. FIGS. 4A and 4B are aberration charts of the zoom lens according to the second exemplary embodiment of the present invention at the wide-angle end and at the telephoto end, respectively.

Figure 5:
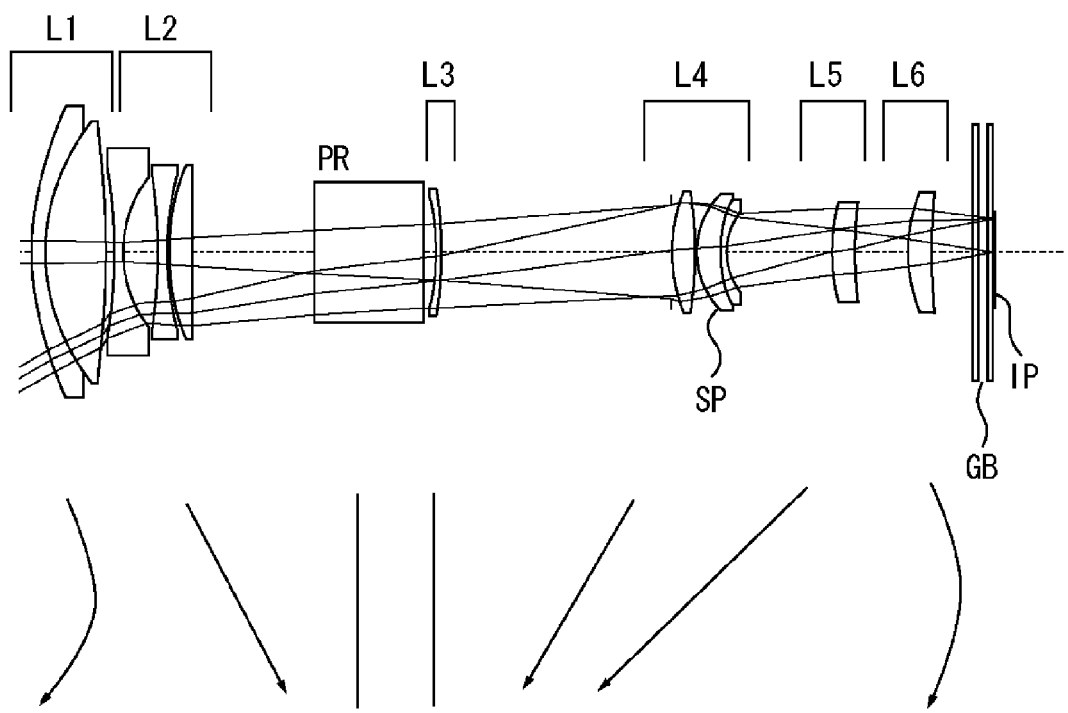
FIG. 5 is a lens cross section of a third exemplary embodiment of the present invention.
Figure 6A:
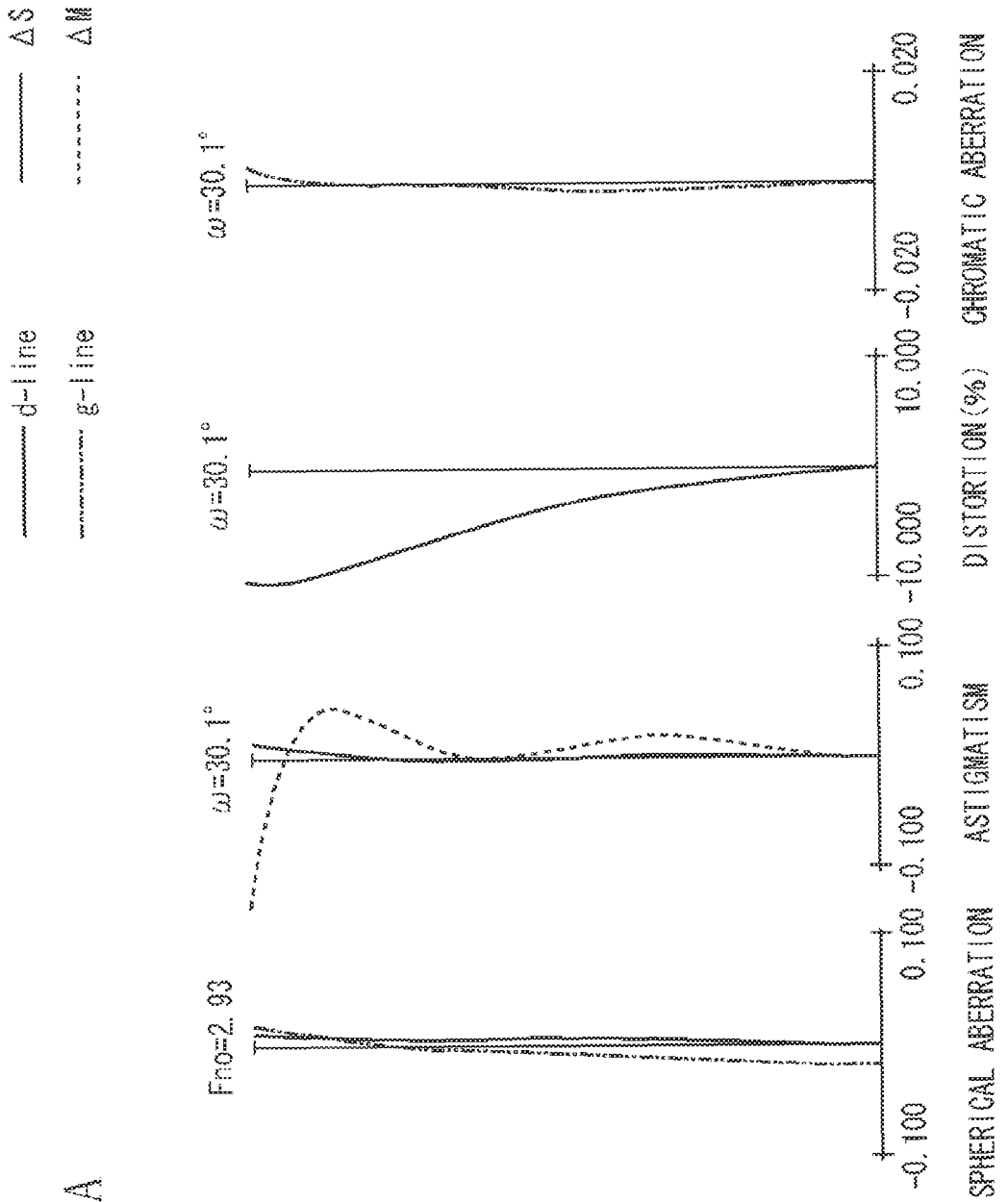

FIG. 5 is a lens cross section of a third exemplary embodiment of the present invention at the wide-angle end. FIGS. 6A and 6B are aberration charts of the zoom lens according to the third exemplary embodiment of the present invention at the wide-angle end and at the telephoto end, respectively.

Figure 7:
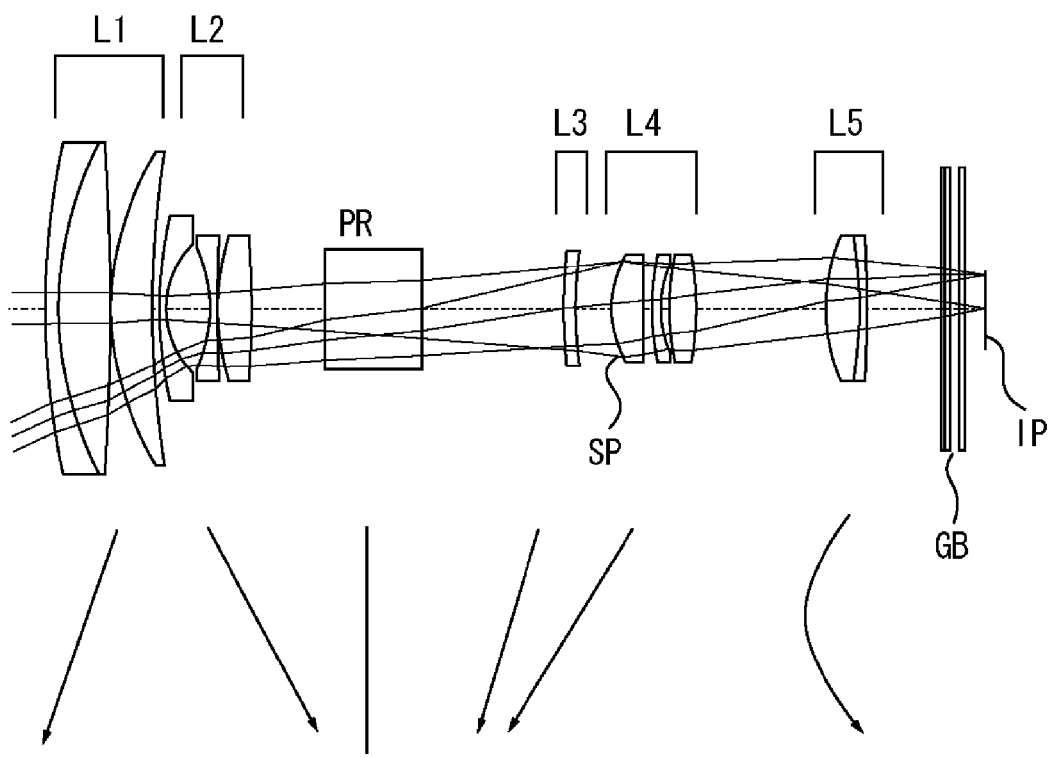
FIG. 7 is a lens cross section of a fourth exemplary embodiment of the present invention.
Figure 8A:
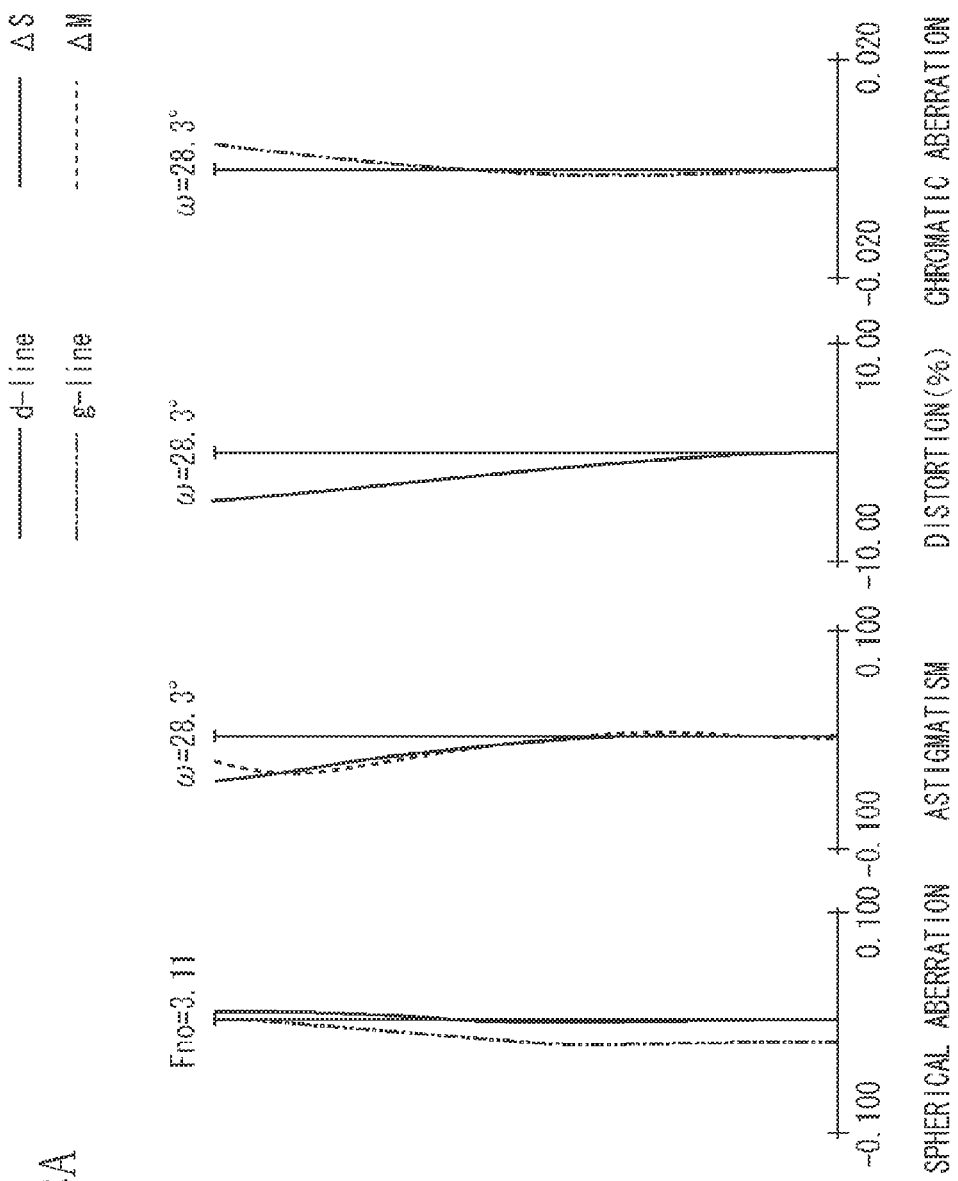

FIG. 7 is a lens cross section of a fourth exemplary embodiment of the present invention at the wide-angle end. FIGS. 8A and 8B are aberration charts of the zoom lens according to the fourth exemplary embodiment of the present invention at the wide-angle end and at the telephoto end, respectively.

Figure 10B:
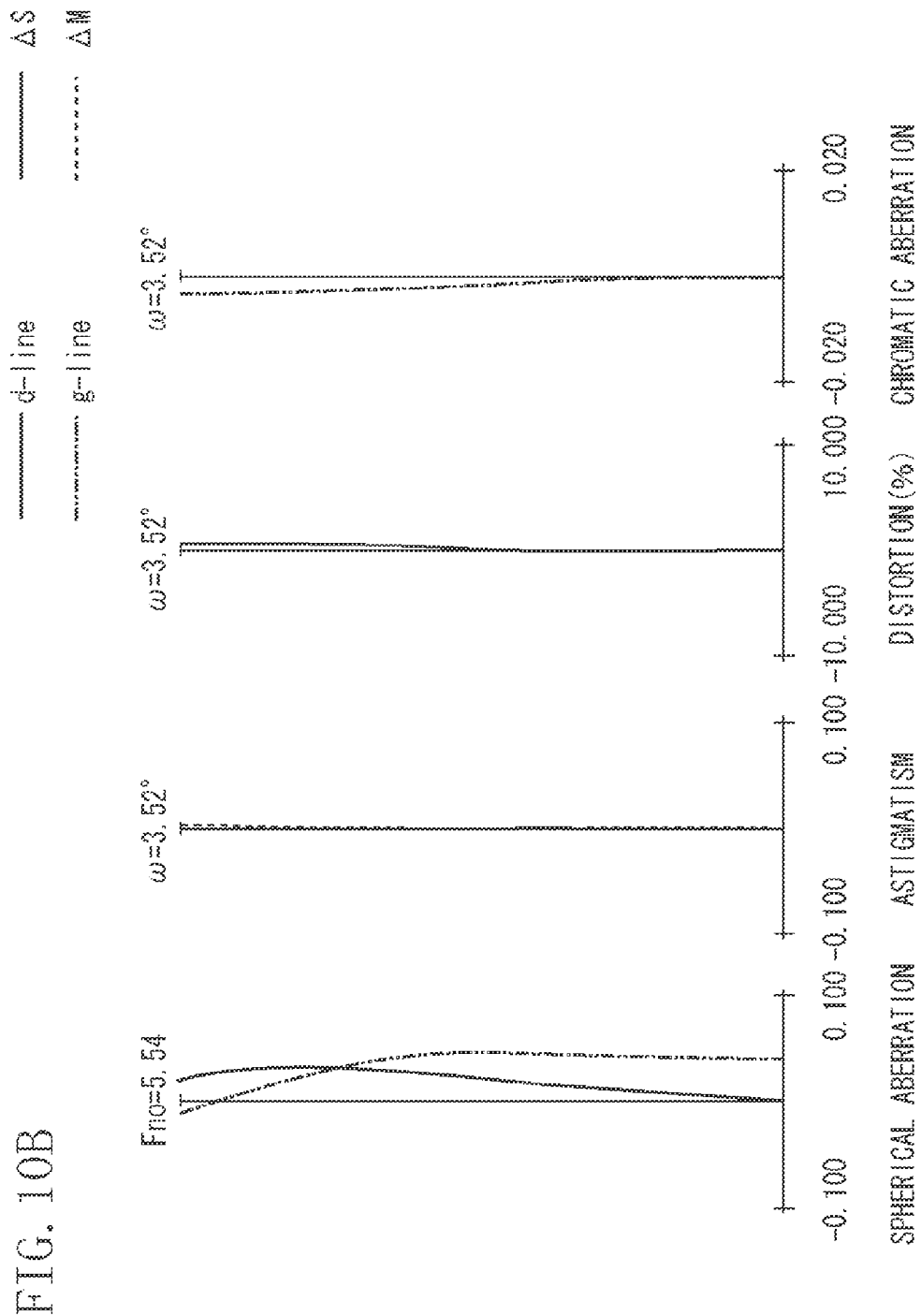

FIG. 9 is a lens cross section of a fifth exemplary embodiment of the present invention at the wide-angle end. FIGS. 10A and 10B are aberration charts of the zoom lens according to the fifth exemplary embodiment of the present invention at the wide-angle end and at the telephoto end, respectively.

Each of the first through fifth exemplary embodiments corresponds to numerical examples 1 through 5, respectively. The numerical examples will be described below. In each of the lens cross sections illustrated in FIGS. 1, 3, 5, and 7, "L1" denotes a first lens unit having a positive refractive power, "L2" denotes a second lens unit having a negative refractive power, "L3" denotes a third lens unit having a negative refractive power, "L4" denotes a fourth lens unit having a positive refractive power, and "L5" denotes a fifth lens unit having a positive refractive power. In the third exemplary embodiment, "L6" denotes a sixth lens unit having a positive refractive power.

In the lens cross section illustrated in FIG. 9, "L1" denotes a first lens unit having a positive refractive power, "L2" denotes a second lens unit having a negative refractive power, "L3" denotes a third lens unit having a negative refractive power, "L4" denotes a fourth lens unit having a positive refractive power, "L5" denotes a fifth lens unit having a negative refractive power, and "L6" denotes a sixth lens unit having a positive refractive power.

In each of the diagrams showing a cross section of the zoom lens (FIGS. 1, 3, 5, 7, and 9), an object side (front side) is shown at the left-hand portion of the figure, and an image side (rear side) is shown at the right-hand portion thereof.

Furthermore, in each of the diagrams showing a cross section of the zoom lens (FIGS. 1, 3, 5, 7, and 9), the zoom lens includes, in order from the object side to the image side, the first lens unit L1, the second lens unit L2, the prism PR, the third lens unit L3, the fourth lens unit L4, and the fifth lens unit L5. In particular, in each of the diagrams showing across section of the zoom lens according to the third and fifth exemplary embodiments (FIGS. 5 and 9), the zoom lens includes a the sixth lens unit L6, which is located on the image side of the fifth lens unit L5.

In each of the diagrams showing a cross section of the zoom lens (FIGS. 1, 3, 5, 7, and 9), "SP" denotes an aperture stop. "GB" denotes a glass block, such as an optical filter or a face plate of an image sensor, which is provided to the zoom lens in terms of the design thereof. The glass block GB includes a plurality of parallel plates. "IP" denotes an image plane. The image plane IP is, when the zoom lens according to an exemplary embodiment of the present invention is used as a photographic optical system of a digital still camera, equivalent to an imaging plane of a solid-state image sensor (photoelectric conversion element) such as a CCD sensor or a CMOS sensor.

In each of the aberration charts (FIGS. 2A and 2B, 4A and 4B, 6A and 6B, 8A and 8B, and 10A and 10B), spherical aberration, astigmatism, distortion, and chromatic aberration of magnification (lateral chromatic aberration) that may occur in the zoom lens according to each exemplary embodiment of the present invention are illustrated.

In the aberration charts illustrating spherical aberration, an F-number (Fno) is taken on the vertical axis. A solid line d corresponds to d-line light while a two-dot chain line g corresponds to g-line light. In the aberration charts illustrating astigmatism, distortion, and chromatic aberration of magnification, "ω" denotes a half angle of view, which is taken on the vertical axis.

In the aberration charts illustrating astigmatism, "ΔM", which is indicated with a dashed line, denotes a meridional image plane with respect to d-line light while "ΔS", which is indicated with a solid line, denotes a sagittal image plane with respect to d-line light. Distortion is represented with d-line light. Chromatic aberration of magnification is represented with g-line light.

In each of the lens cross sections (FIGS. 1, 3, 5, 7, and 9), each lens unit moves during zooming from the wide-angle end to the telephoto end along a moving locus indicated by an arrow, which indicates the position of each lens unit in relation to the zooming position.

In the zoom lens according to each of the first through fifth exemplary embodiments, at least the second lens unit L2 and the fourth lens unit L4 move along the optical axis during zooming. The prism PR does not move for zooming and remains stationary during zooming.

In each exemplary embodiment of the present invention, each of the wide-angle end and the telephoto end refers to a zooming position when a lens unit for varying magnification is positioned at each of the ends of a range in which the magnification varying lens unit can mechanically move along the optical axis.

In the first exemplary embodiment, during zooming from the wide-angle end to the telephoto end, the first lens unit L1, the reflection unit PR, and the third lens unit L3 remain stationary while the second lens unit L2 moves monotonically towards the image side and the fourth lens unit L4 moves monotonically towards the object side. It is also useful if the second lens unit L2 moves towards the image side along a moving locus convex towards the image side.

In each exemplary embodiment of the present invention, variation on the image plane, which may occur during variable magnification, is corrected by moving the fifth lens unit L5 along a locus convex towards the object side. Focusing when the shooting distance is changed is performed by moving the fifth lens unit L5.

In addition, in each exemplary embodiment of the present invention, camera shake is corrected by moving a part of lenses included in the fourth lens unit L4 (a convex lens of the fourth lens unit L4 located third from the object side) in a direction having a component perpendicular to the optical axis.

In the second exemplary embodiment of the present invention, the third lens unit L3 moves towards the object side during zooming from the wide-angle end to the telephoto end. Accordingly, the second exemplary embodiment can effectively correct spherical aberration and coma that may occur at middle focal length positions. The configuration of the second exemplary embodiment except the movement of the third lens unit L3 is similar to that of the first exemplary embodiment.

In the third exemplary embodiment, the prism PR and the third lens unit L3 remain stationary during zooming from the wide-angle end to the telephoto end. Furthermore, the first lens unit L1 moves towards the object side along a moving locus convex towards the image side. The second lens unit L2 moves monotonically towards the image side. In addition, the fourth lens unit L4 moves monotonically towards the object side and the fifth lens unit L5 moves monotonically towards the object side.

The zoom lens according to the third exemplary embodiment includes the sixth lens unit L6 having a positive refractive power. In the third exemplary embodiment, variation on the image plane that may occur due to variable magnification is corrected by moving the sixth lens unit L6 along a locus convex towards the object side. Furthermore, focusing when the shooting distance is changed is executed by moving the sixth lens unit L6. Camera shake is corrected by moving the entire fourth lens unit L4 in a direction having a component perpendicular to the optical axis.

In the fourth exemplary embodiment of the present invention, the reflection unit PR remains stationary during zooming from the wide-angle end to the telephoto end. In the fourth exemplary embodiment, all the lens units move during zooming. Accordingly, the fourth exemplary embodiment can achieve a desired zoom ratio while enabling reduction of the size of the camera.

In the fifth exemplary embodiment of the present invention, the reflection unit PR and the third lens unit L3 remain stationary during zooming from the wide-angle end to the telephoto end. In addition, during zooming from the wide-angle end to the telephoto end, the first lens unit L1 moves towards the object side, the second lens unit L2 moves monotonically towards the image side, the fourth lens unit L4 moves monotonically towards the object side, and the fifth lens unit L5 moves monotonically towards the object side. Furthermore, the sixth lens unit L6 also moves during zooming from the wide-angle end to the telephoto end.

The fifth exemplary embodiment corrects variation of aberration that may occur during zooming by moving the fifth lens unit L5 having a negative refractive power during zooming from the wide-angle end to the telephoto end. However, it is also useful if the fifth lens unit L5 remains stationary during zooming.

In the fifth exemplary embodiment, focusing when the shooting distance is changed is executed by moving the sixth lens unit L6. Camera shake is corrected by moving a part of lenses included in the fourth lens unit L4 in a direction having a component perpendicular to the optical axis. More specifically, the fifth exemplary embodiment corrects camera shake by moving a positive lens of the fourth lens unit L4 located closest to the image side.

In each exemplary embodiment of the present invention, the refractive power of the first lens unit L1 is set so that the condition (1) is satisfied in order to reduce the amount of movement of the first lens unit L1 and the second lens unit L2 during zooming. In addition, each exemplary embodiment includes the third lens unit L3 having a negative refractive power. Accordingly, the zoom lens according to each exemplary embodiment can increase the positive refractive power of the fourth lens unit L4. With this configuration, each exemplary embodiment can achieve a high zoom ratio by greatly moving the fourth lens unit L4 towards the object side.

With the above-described configuration, each exemplary embodiment can implement a zoom lens having a high zoom ratio and useful in effectively reducing the thickness of the camera by reducing the amount of movement of the first lens unit L1 and the second lens unit L2 during zooming.

In addition, in order to reduce the length of the cam tube for moving the first lens unit L1 and to achieve a desired zoom ratio, in each exemplary embodiment, the amount of movement of the first lens unit L1 during zooming (M1) satisfies the condition (2). Furthermore, in order to provide a great refractive power while achieving a zoom lens useful in effectively reducing the thickness of the camera, in each exemplary embodiment, the refractive power of the fourth lens unit L4 is set so that the condition (3) is satisfied.

In addition, in each exemplary embodiment of the present invention, in order to achieve a desired zoom ratio by using the smallest possible number of lenses as lenses included in the third lens unit L3 and the fourth lens unit L4, the refractive power of each of the third lens unit L3 and the fourth lens unit L4 is appropriately set so that the condition (4) is satisfied.

Furthermore, In order to maintain a high optical performance of the zoom lens while effectively reducing the thickness of the camera, in each exemplary embodiment, the negative lens and the positive lens included in the second lens unit L2 are set so that the condition (5) is satisfied.

In the zoom lens according to each of the first through fifth exemplary embodiments, in order to alleviate the variation of F-number that may occur during zooming, it is also useful if the aperture stop is controlled according to the zooming position. In addition, if the zoom lens according to each exemplary embodiment is implemented on a digital still camera, it is also useful if distortion remaining in the optical system is electrically corrected (corrected by executing image processing).

Numerical examples 1 through 5, which respectively correspond to the first through fifth exemplary embodiments of the present invention, are set forth below. In each of the numerical examples 1 through 5, "r" denotes a radius of curvature of each optical surface (in the unit of millimeter (mm)), "d" denotes a thickness of the optical member or an air interval between adjacent surfaces, "nd" denotes a refractive index and an Abbe number of an optical member with respect to d-line light. "vd" denotes an Abbe number of an optical member with respect to d-line light. The Abbe number vd can be calculated by the following expression:

$$vd = (Nd-1)/(NF-NC)$$

where "Nd" denotes the refractive index with respect to d-line light (wavelength: 587.6 nm), "NF" denotes the refractive index with respect to F-line light (wavelength: 486.1 nm), and "NC" denotes the refractive index with respect to C-line light (wavelength: 656.3 nm).

In addition, each of "A4", "A6", "A8", and "A10" denotes an aspheric coefficient. The aspheric shape is expressed as $$x = (h^2/R)/[1+\{1-(1+k)(h/R)^2\}^{1/2}] + A4h^4 + A6h^6 + A8h^8 + A10h^{10}$$

where "k" denotes a conic coefficient, "x" denotes a displacement from a surface vertex along the optical axis in a position at a height "h" from the optical axis, and "R" denotes a paraxial radius of curvature. Furthermore, "e-X" denotes "×10$^{-X}$". The relationship between each condition described above and each numerical example is set forth in Table 1.

Numerical Example 1
Unit: mm

Surface data

| Surface number | r | d | nd | vd | Effective diameter |
|---|---|---|---|---|---|
| 1 | 47.193 | 1.25 | 1.84666 | 23.8 | 24.96 |
| 2 | 22.500 | 4.42 | 1.59201 | 67.0 | 22.74 |
| 3 | −294.131 | 0.08 | | | 22.04 |
| 4 | 21.328 | 3.02 | 1.77250 | 49.6 | 20.57 |

-continued

Numerical Example 1
Unit: mm

| | | | | | |
|---|---|---|---|---|---|
| 5 | 96.161 | Variable | | | 19.99 |
| 6 | −185.505 | 0.75 | 1.88300 | 40.8 | 14.54 |
| 7 | 8.659 | 3.30 | | | 11.53 |
| 8 | −20.793 | 1.00 | 1.77250 | 49.6 | 11.41 |
| 9* | 23.729 | 0.05 | | | 11.52 |
| 10 | 17.009 | 1.71 | 1.94595 | 18.0 | 11.70 |
| 11 | 1312.287 | Variable | | | 11.61 |
| 12 | ∞ | 8.75 | 1.83400 | 37.2 | 8.61 |
| 13 | ∞ | Variable | | | 7.44 |
| 14 | −43.096 | 0.45 | 1.51633 | 64.1 | 7.22 |
| 15 | −51.920 | Variable | | | 7.29 |
| 16* | 7.916 | 3.13 | 1.58913 | 61.1 | 8.08 |
| 17 | −25.562 | 0.25 | | | 7.56 |
| 18 | −37.626 | 0.55 | 1.74950 | 35.3 | 7.32 |
| 19 | 14.424 | 1.65 | | | 6.99 |
| 20 (Stop) | ∞ | 4.10 | | | 6.83 |
| 21* | 10.708 | 2.92 | 1.49710 | 81.6 | 7.88 |
| 22 | −69.699 | 4.01 | | | 7.58 |
| 23 | −6.942 | 0.68 | 1.74320 | 49.3 | 6.88 |
| 24 | −13.764 | Variable | | | 7.27 |
| 25* | 26.780 | 2.69 | 1.69350 | 53.2 | 10.39 |
| 26 | −18.810 | 0.55 | 1.84666 | 23.8 | 10.33 |
| 27 | −36.499 | Variable | | | 10.33 |
| 28 | ∞ | 0.30 | 1.49400 | 75.0 | 21.46 |
| 29 | ∞ | 0.00 | | | 21.46 |
| 30 | ∞ | 0.50 | 1.51633 | 64.1 | 21.46 |
| 31 | ∞ | | | | 21.46 |

Aspheric Coefficients

| | | |
|---|---|---|
| R9: | K = −1.02310e+000 | A4 = −9.07934e−006 |
| | A6 = −1.20746e−007 | A8 = 1.15417e−008 |
| | A10 = −1.81191e−010 | |
| R16: | K = −3.45590e−001 | A4 = −5.08301e−005 |
| | A6 = −7.53344e−007 | A8 = −7.29355e−009 |
| R21: | K = −4.39252e−001 | A4 = −5.74677e−005 |
| | A6 = 2.23307e−006 | A8 = −9.10787e−008 |
| | A10 = 2.94561e−009 | |
| R25: | K = 3.03952e−001 | A4 = −4.90484e−006 |
| | A6 = 4.37117e−007 | A8 = −3.76365e−010 |
| | A10 = −1.29106e−010 | |

Various Data
Zoom ratio: 9.39

| | Wide-angle end | Middle focal Length | Telephoto end |
|---|---|---|---|
| Focal Length | 7.02 | 23.33 | 65.88 |
| F-number | 3.10 | 4.15 | 5.55 |
| Angle of View | 28.90 | 9.43 | 3.37 |
| Image Height | 3.88 | 3.88 | 3.88 |
| Lens Total Length | 55.74 | 55.74 | 55.74 |
| BF | 55.74 | 55.74 | 55.74 |
| d5 | 1.00 | 7.81 | 12.20 |
| d11 | 12.00 | 5.16 | 0.81 |
| d13 | 1.20 | 1.20 | 1.20 |
| d15 | 15.57 | 4.93 | 0.50 |
| d24 | 5.17 | 13.01 | 22.39 |
| d27 | 5.36 | 8.13 | 3.17 |
| Entrance Pupil Position | 21.70 | 51.19 | 98.57 |
| Exit Pupil Position | −38.11 | −177.00 | 120.47 |
| Front Principal Point Position | 27.44 | 71.45 | 200.60 |
| Rear Principal Point Position | −6.65 | −22.96 | −65.51 |

-continued

Numerical Example 1
Unit: mm

Zoom Lens Unit Data

| Lens Unit | First Surface | Focal Length | Lens Configuration Length | Front Principal Point Position | Rear Principal Point Position |
|---|---|---|---|---|---|
| 1 | 1 | 27.32 | 8.77 | 2.39 | −2.90 |
| 2 | 6 | −8.03 | 6.81 | 0.64 | −4.51 |
| PR | 12 | ∞ | 8.75 | 2.39 | −2.39 |
| 3 | 14 | −499.82 | 0.45 | −1.48 | −1.78 |
| 4 | 16 | 18.18 | 17.29 | −5.12 | −14.72 |
| 5 | 25 | 24.87 | 3.24 | 0.77 | −1.16 |
| 6 | 28 | ∞ | 0.80 | 0.27 | −0.27 |

Single Lens Data

| Lens | First Surface | Focal Length |
|---|---|---|
| 1 | 1 | −52.00 |
| 2 | 2 | 35.49 |
| 3 | 4 | 34.86 |
| 4 | 6 | −9.35 |
| 5 | 8 | −14.21 |
| 6 | 10 | 18.21 |
| 7 | 12 | 0.00 |
| 8 | 14 | −499.82 |
| 9 | 16 | 10.63 |
| 10 | 18 | −13.85 |
| 11 | 21 | 18.90 |
| 12 | 23 | −19.69 |
| 13 | 25 | 16.33 |
| 14 | 26 | −46.51 |
| 15 | 28 | 0.00 |
| 16 | 30 | 0.00 |

Numerical Example 2
Unit: mm

Surface data

| Surface number | r | d | nd | vd | Effective diameter |
|---|---|---|---|---|---|
| 1 | 45.825 | 1.25 | 1.84666 | 23.8 | 25.53 |
| 2 | 22.500 | 4.55 | 1.59201 | 67.0 | 23.20 |
| 3 | −341.036 | 0.08 | | | 22.51 |
| 4 | 21.603 | 3.12 | 1.77250 | 49.6 | 21.06 |
| 5 | 100.716 | Variable | | | 20.47 |
| 6 | −112.924 | 0.75 | 1.88300 | 40.8 | 14.76 |
| 7 | 8.706 | 3.27 | | | 11.70 |
| 8 | −24.097 | 1.00 | 1.77250 | 49.6 | 11.61 |
| 9* | 25.397 | 0.05 | | | 11.73 |
| 10 | 17.854 | 1.70 | 1.94595 | 18.0 | 11.91 |
| 11 | 1419.123 | Variable | | | 11.81 |
| 12 | ∞ | 8.75 | 1.83400 | 37.2 | 8.56 |
| 13 | ∞ | Variable | | | 7.65 |
| 14 | −30.818 | 0.50 | 1.65844 | 50.9 | 7.72 |
| 15 | −61.136 | Variable | | | 7.81 |
| 16* | 8.160 | 3.17 | 1.58913 | 61.1 | 8.78 |
| 17 | −30.248 | 0.23 | | | 8.22 |
| 18 | −52.236 | 0.55 | 1.74950 | 35.3 | 7.95 |
| 19 | 15.466 | 1.65 | | | 7.55 |
| 20 (Stop) | ∞ | 3.41 | | | 7.11 |
| 21* | 11.206 | 2.96 | 1.49710 | 81.6 | 8.30 |
| 22 | −55.609 | 4.65 | | | 8.01 |
| 23 | −6.875 | 0.55 | 1.74320 | 49.3 | 7.09 |
| 24 | −11.546 | Variable | | | 7.44 |
| 25* | 28.108 | 2.44 | 1.69350 | 53.2 | 9.69 |
| 26 | −24.166 | 0.55 | 1.84666 | 23.8 | 9.60 |

-continued

Numerical Example 2
Unit: mm

| | | | | |
|---|---|---|---|---|
| 27 | −70.476 | Variable | | 9.58 |
| 28 | ∞ | 0.30 | 1.49400 | 75.0 | 21.46 |
| 29 | ∞ | 0.00 | | 21.46 |
| 30 | ∞ | 0.50 | 1.51633 | 64.1 | 21.46 |
| 31 | ∞ | | | 21.46 |

Aspheric Coefficients

| | | |
|---|---|---|
| R9: | K = −1.94708e+000 | A4 = −1.75848e−005 |
| | A6 = −4.88121e−007 | A8 = 1.84742e−008 |
| | A10 = −3.30788e−010 | |
| R16: | K = −3.63782e−001 | A4 = −5.76821e−005 |
| | A6 = −6.84932e−007 | A8 = −4.25839e−009 |
| R21: | K = −5.07037e−001 | A4 = −6.45555e−005 |
| | A6 = 1.94216e−006 | A8 = −8.03587e−008 |
| | A10 = 2.50413e−009 | |
| R25: | K = 1.95064e+000 | A4 = 1.71821e−006 |
| | A6 = 4.25399e−007 | A8 = −5.19636e−009 |
| | A10 = 1.22742e−011 | |

Various Data
Zoom ratio: 9.42

| | Wide-angle end | Middle focal Length | Telephoto end |
|---|---|---|---|
| Focal Length | 7.02 | 23.31 | 66.13 |
| F-number | 3.10 | 4.16 | 5.18 |
| Angle of View | 28.91 | 9.44 | 3.35 |
| Image Height | 3.88 | 3.88 | 3.88 |
| Lens Total Length | 54.12 | 54.12 | 54.12 |
| BF | 54.12 | 54.12 | 54.12 |
| d5 | 1.10 | 7.63 | 12.24 |
| d11 | 11.96 | 5.41 | 0.81 |
| d13 | 5.00 | 1.75 | 1.20 |
| d15 | 10.88 | 3.90 | 0.50 |
| d24 | 5.42 | 11.92 | 22.09 |
| d27 | 5.45 | 9.15 | 3.00 |
| Entrance Pupil Position | 22.29 | 50.54 | 101.80 |
| Exit Pupil Position | −31.37 | −64.14 | −391.74 |
| Front Principal Point Position | 27.76 | 65.44 | 156.78 |
| Rear Principal Point Position | −6.55 | −22.84 | −65.67 |

Zoom Lens Unit Data

| Lens Unit | First Surface | Focal Length | Lens Configuration Length | Front Principal Point Position | Rear Principal Point Position |
|---|---|---|---|---|---|
| 1 | 1 | 27.25 | 8.99 | 2.42 | −3.01 |
| 2 | 6 | −8.26 | 6.77 | 0.51 | −4.64 |
| PR | 12 | ∞ | 8.75 | 2.39 | −2.39 |
| 3 | 14 | −95.00 | 0.50 | −0.31 | −0.61 |
| 4 | 16 | 16.37 | 17.17 | −3.00 | −13.86 |
| 5 | 25 | 33.24 | 2.99 | 0.39 | −1.36 |
| 6 | 28 | ∞ | 0.80 | 0.27 | −0.27 |

Single Lens Data

| Lens | First Surface | Focal Length |
|---|---|---|
| 1 | 1 | −53.53 |
| 2 | 2 | 35.82 |
| 3 | 4 | 35.00 |
| 4 | 6 | −9.13 |
| 5 | 8 | −15.87 |

-continued

Numerical Example 2
Unit: mm

| | | |
|---|---|---|
| 6 | 10 | 19.10 |
| 7 | 12 | 0.00 |
| 8 | 14 | −95.00 |
| 9 | 16 | 11.25 |
| 10 | 18 | −15.87 |
| 11 | 21 | 19.04 |
| 12 | 23 | −24.07 |
| 13 | 25 | 19.10 |
| 14 | 26 | −43.68 |
| 15 | 28 | 0.00 |
| 16 | 30 | 0.00 |

Numerical Example 3
Unit: mm

Surface data

| Surface number | r | d | nd | vd | Effective diameter |
|---|---|---|---|---|---|
| 1 | 27.409 | 1.20 | 1.84666 | 23.8 | 23.14 |
| 2 | 17.000 | 5.67 | 1.69680 | 55.5 | 20.78 |
| 3* | −63.919 | Variable | | | 19.44 |
| 4 | −45.403 | 0.80 | 1.88300 | 40.8 | 16.16 |
| 5 | 9.646 | 3.35 | | | 13.08 |
| 6* | −32.193 | 1.00 | 1.69680 | 55.5 | 13.10 |
| 7* | 25.549 | 0.10 | | | 13.33 |
| 8 | 19.232 | 2.25 | 1.92286 | 18.9 | 13.62 |
| 9 | −257.294 | Variable | | | 13.53 |
| 10 | ∞ | 10.00 | 1.80610 | 33.3 | 10.75 |
| 11 | ∞ | Variable | | | 9.74 |
| 12 | −21.336 | 0.50 | 1.77250 | 49.6 | 9.62 |
| 13 | −28.020 | Variable | | | 9.69 |
| 14 (Stop) | ∞ | 0.10 | | | 8.32 |
| 15* | 11.844 | 2.23 | 1.48749 | 70.2 | 9.08 |
| 16 | −26.746 | 0.10 | | | 9.08 |
| 17 | 6.162 | 2.26 | 1.52249 | 59.8 | 8.68 |
| 18 | 9.470 | 0.60 | 2.00330 | 28.3 | 7.74 |
| 19 | 5.405 | Variable | | | 6.95 |
| 20 | 23.624 | 2.21 | 1.51633 | 64.1 | 7.70 |
| 21 | 68.762 | Variable | | | 7.69 |
| 22* | 12.864 | 2.23 | 1.48749 | 70.2 | 9.32 |
| 23 | 66.456 | Variable | | | 9.05 |
| 24 | ∞ | 0.60 | 1.51633 | 64.1 | 20.00 |
| 25 | ∞ | 0.80 | | | 20.00 |
| 26 | ∞ | 0.40 | 1.51633 | 64.1 | 20.00 |
| 27 | ∞ | | | | |

Aspheric Coefficients

| | | |
|---|---|---|
| R3: | K = 0.00000e+000 | A4 = 1.21839e−005 |
| | A6 = −2.23611e−008 | A8 = 5.93495e−011 |
| | A10 = −4.26858e−014 | |
| R6: | K = 0.00000e+000 | A4 = −4.65389e−005 |
| | A6 = 3.78954e−006 | A8 = −3.68810e−008 |
| | A10 = 3.08029e−010 | |
| R7: | K = −1.75374e+001 | A4 = 3.15322e−005 |
| | A6 = 1.71209e−006 | A8 = −2.07971e−008 |
| | A10 = −1.36630e−011 | |
| R15: | K = 1.48056e+000 | A4 = −2.46088e−004 |
| | A6 = −1.41274e−006 | A8 = −3.94810e−008 |
| R22: | K = −1.42172e−002 | A4 = −1.07342e−005 |
| | A6 = 5.72804e−006 | A8 = −3.33770e−007 |
| | A10 = 6.81978e−009 | |

-continued

Numerical Example 3
Unit: mm

Various Data
Zoom ratio: 9.44

|  | Wide-angle end | Middle focal Length | Telephoto end |
|---|---|---|---|
| Focal Length | 5.96 | 13.95 | 56.23 |
| F-number | 2.93 | 3.89 | 5.69 |
| Angle of View | 30.08 | 13.90 | 3.51 |
| Image Height | 3.45 | 3.45 | 3.45 |
| Lens Total Length | 32.37 | 32.37 | 32.37 |
| BF | 32.37 | 32.37 | 32.37 |
| d3 | 0.77 | 5.57 | 12.08 |
| d9 | 11.57 | 5.97 | 0.55 |
| d11 | 1.20 | 1.20 | 1.20 |
| d13 | 21.74 | 13.23 | 0.50 |
| d19 | 10.11 | 13.07 | 1.42 |
| d21 | 4.83 | 12.22 | 35.76 |
| d23 | 3.75 | 1.86 | 2.72 |
| Entrance Pupil Position | 19.49 | 33.30 | 62.95 |
| Exit Pupil Position | −66.87 | 1616.30 | 147.29 |
| Front Principal Point Position | 24.92 | 47.37 | 140.67 |
| Rear Principal Point Position | −5.82 | −13.81 | −56.09 |

Zoom Lens Unit Data

| Lens Unit | First Surface | Focal Length | Lens Configuration Length | Front Principal Point Position | Rear Principal Point Position |
|---|---|---|---|---|---|
| 1 | 1 | 31.13 | 6.87 | 1.18 | −2.94 |
| 2 | 4 | −9.56 | 7.50 | 0.02 | −5.86 |
| PR | 10 | ∞ | 10.00 | 2.77 | −2.77 |
| 3 | 12 | −119.68 | 0.50 | −0.93 | −1.22 |
| 4 | 14 | 20.51 | 5.29 | −5.21 | −6.64 |
| 5 | 20 | 68.56 | 2.21 | −0.75 | −2.18 |
| 6 | 22 | 32.28 | 2.23 | −0.35 | −1.83 |
| 7 | 24 | ∞ | 1.80 | 0.73 | −0.73 |

Single Lens Data

| Lens | First Surface | Focal Length |
|---|---|---|
| 1 | 1 | −55.82 |
| 2 | 2 | 19.84 |
| 3 | 4 | −8.95 |
| 4 | 6 | −20.30 |
| 5 | 8 | 19.47 |
| 6 | 10 | 0.00 |
| 7 | 12 | −119.68 |
| 8 | 15 | 17.16 |
| 9 | 17 | 27.35 |
| 10 | 18 | −13.55 |
| 11 | 20 | 68.56 |
| 12 | 22 | 32.28 |
| 13 | 24 | 0.00 |
| 14 | 26 | 0.00 |

Numerical Example 4
Unit: mm

Surface data

| Surface number | r | d | nd | νd | Effective diameter |
|---|---|---|---|---|---|
| 1 | 59.490 | 1.20 | 1.84666 | 23.8 | 27.54 |
| 2 | 26.459 | 4.68 | 1.59240 | 68.3 | 26.62 |
| 3 | −144.991 | 0.05 |  |  | 26.54 |
| 4 | 22.311 | 3.71 | 1.77250 | 49.6 | 24.88 |
| 5 | 75.691 | Variable |  |  | 24.20 |
| 6 | 30.075 | 0.70 | 1.88300 | 40.8 | 13.52 |
| 7 | 7.435 | 3.81 |  |  | 10.57 |
| 8 | −11.600 | 0.70 | 1.88300 | 40.8 | 10.17 |
| 9 | 38.883 | 0.05 |  |  | 10.30 |
| 10* | 20.145 | 2.89 | 2.14352 | 17.8 | 10.43 |
| 11 | −129.690 | Variable |  |  | 10.24 |
| 12 | ∞ | 8.50 | 1.83400 | 37.2 | 8.48 |
| 13 | ∞ | Variable |  |  | 7.67 |
| 14 | 100.003 | 1.00 | 1.83400 | 37.2 | 7.97 |
| 15* | 39.837 | Variable |  |  | 7.63 |
| 16* | 7.974 | 2.70 | 1.65100 | 56.2 | 7.73 |
| 17 | 91.754 | 0.94 |  |  | 7.64 |
| 18 | 17.630 | 0.70 | 1.80610 | 33.3 | 7.55 |
| 19 | 7.501 | 0.79 |  |  | 7.26 |
| 20* | 23.449 | 2.46 | 1.49700 | 81.6 | 7.33 |
| 21 | −23.680 | Variable |  |  | 7.72 |
| 22* | 14.214 | 2.84 | 1.51633 | 64.1 | 10.67 |
| 23 | −34.599 | 0.60 | 1.84666 | 23.8 | 10.41 |
| 24 | −280.114 | Variable |  |  | 10.32 |
| 25 | ∞ | 0.31 | 1.54427 | 70.6 | 20.94 |
| 26 | ∞ | 0.50 | 1.49400 | 75.0 | 20.94 |
| 27 | ∞ | 0.40 |  |  | 20.94 |
| 28 | ∞ | 0.50 | 1.49831 | 65.1 | 20.94 |
| 29 | ∞ |  |  |  | 20.94 |

Aspheric Coefficients

R10: $K = -1.03347e+000$    $A4 = -2.38398e-005$
     $A6 = -4.83283e-008$    $A8 = -2.47510e-008$
     $A10 = 3.89006e-010$

R15: $K = -3.31844e+000$    $A4 = -6.56456e-006$
     $A6 = -1.69541e-007$

R16: $K = -4.63421e-001$    $A4 = -8.00900e-005$
     $A6 = -3.40259e-007$    $A8 = -1.39155e-008$

R20: $K = 1.20084e+000$    $A4 = 1.36295e-005$
     $A6 = 1.60782e-007$    $A8 = 1.34386e-007$

R22: $K = 6.91777e-002$    $A4 = 4.66205e-006$
     $A6 = 7.37313e-007$    $A8 = -2.79366e-008$
     $A10 = 4.46765e-010$

Various Data
Zoom ratio: 7.68

|  | Wide-angle end | Middle focal Length | Telephoto end |
|---|---|---|---|
| Focal Length | 7.20 | 18.75 | 55.33 |
| F-number | 3.11 | 3.72 | 4.42 |
| Angle of View | 28.28 | 11.68 | 4.01 |
| Image Height | 3.88 | 3.88 | 3.88 |
| Lens Total Length | 70.26 | 70.26 | 70.26 |
| BF | 70.26 | 70.26 | 70.26 |
| d5 | 0.60 | 7.62 | 13.77 |
| d11 | 6.48 | 3.04 | 0.80 |
| d13 | 12.60 | 5.70 | 2.30 |
| d15 | 3.18 | 1.87 | 0.28 |
| d21 | 11.62 | 17.57 | 27.28 |
| d24 | 6.75 | 8.99 | 4.26 |
| Entrance Pupil Position | 20.95 | 46.64 | 106.90 |
| Exit Pupil Position | −45.37 | −87.31 | −2326.92 |

Numerical Example 4
Unit: mm

|  | | | |
|---|---|---|---|
| Front Principal Point Position | 27.06 | 61.46 | 160.91 |
| Rear Principal Point Position | −5.07 | −16.62 | −53.19 |

Zoom Lens Unit Data

| Lens Unit | First Surface | Focal Length | Lens Configuration Length | Front Principal Point Position | Rear Principal Point Position |
|---|---|---|---|---|---|
| 1 | 1 | 29.89 | 9.63 | 2.37 | −3.36 |
| 2 | 6 | −7.89 | 8.15 | 1.17 | −4.70 |
| PR | 12 | ∞ | 8.50 | 2.32 | −2.32 |
| 3 | 14 | −80.00 | 1.00 | 0.91 | 0.36 |
| 4 | 16 | 16.63 | 7.60 | −0.09 | −5.80 |
| 5 | 22 | 33.09 | 3.44 | −0.37 | −2.55 |
| 6 | 25 | ∞ | 1.71 | 0.63 | −0.63 |

Single Lens Data

| Lens | First Surface | Focal Length |
|---|---|---|
| 1 | 1 | −57.24 |
| 2 | 2 | 38.16 |
| 3 | 4 | 39.75 |
| 4 | 6 | −11.35 |
| 5 | 8 | −10.05 |
| 6 | 10 | 15.41 |
| 7 | 12 | 0.00 |
| 8 | 14 | −80.00 |
| 9 | 16 | 13.25 |
| 10 | 18 | −16.71 |
| 11 | 20 | 24.12 |
| 12 | 22 | 19.91 |
| 13 | 23 | −46.68 |
| 14 | 25 | 0.00 |
| 15 | 26 | 0.00 |
| 16 | 28 | 0.00 |

Numerical Example 5
Unit: mm

Surface data

| Surface number | r | d | nd | vd | Effective diameter |
|---|---|---|---|---|---|
| 1 | 43.287 | 1.25 | 1.84666 | 23.8 | 23.45 |
| 2 | 22.500 | 3.72 | 1.59201 | 67.0 | 22.41 |
| 3 | 337.014 | 0.08 | | | 22.23 |
| 4 | 22.221 | 3.02 | 1.77250 | 49.6 | 21.48 |
| 5 | 85.423 | Variable | | | 20.92 |
| 6 | 241.556 | 1.00 | 1.84862 | 40.0 | 13.88 |
| 7* | 7.319 | 3.24 | | | 10.49 |
| 8 | −16.585 | 0.75 | 1.77250 | 49.6 | 10.41 |
| 9 | 28.603 | 0.05 | | | 10.53 |
| 10 | 17.010 | 1.58 | 1.94595 | 18.0 | 10.70 |
| 11 | −268.954 | Variable | | | 10.62 |
| 12 | ∞ | 8.75 | 1.83400 | 37.2 | 7.97 |
| 13 | ∞ | Variable | | | 6.78 |
| 14 | 162.477 | 0.50 | 1.48749 | 70.2 | 6.53 |
| 15 | 55.082 | Variable | | | 6.57 |
| 16* | 7.893 | 3.12 | 1.58913 | 61.1 | 8.25 |
| 17 | −31.205 | 0.19 | | | 7.76 |
| 18 | −206.191 | 0.55 | 1.80610 | 33.3 | 7.51 |
| 19 | 13.007 | 1.72 | | | 7.17 |
| 20 (Stop) | ∞ | 4.17 | | | 7.03 |
| 21* | 11.285 | 2.85 | 1.49700 | 81.6 | 7.92 |
| 22 | −42.485 | Variable | | | 7.76 |
| 23 | −7.778 | 0.55 | 1.74320 | 49.3 | 7.35 |
| 24 | −12.738 | Variable | | | 7.64 |
| 25* | 22.070 | 2.49 | 1.69350 | 53.2 | 9.86 |
| 26 | −43.370 | 0.55 | 1.84666 | 23.9 | 9.68 |
| 27 | −10000.000 | Variable | | | 9.61 |
| Image plane | ∞ | | | | |

Aspheric Coefficients

| | | |
|---|---|---|
| R7: | K = −2.53272e−002 | A4 = 7.25940e−006 |
| | A6 = −3.82125e−007 | A8 = 2.31405e−008 |
| | A10 = 2.33230e−010 | |
| R16: | K = −4.16021e−001 | A4 = −5.25909e−005 |
| | A6 = −7.99241e−007 | A8 = −3.79321e−010 |
| R21: | K = −4.07748e−001 | A4 = −5.40459e−005 |
| | A6 = 1.43022e−006 | A8 = −4.39568e−008 |
| | A10 = 1.62988e−009 | |
| R25: | K = 6.93554e−001 | A4 = 3.70565e−006 |
| | A6 = −8.05622e−007 | A8 = 3.60423e−008 |
| | A10 = −4.98167e−010 | |

Various Data
Zoom ratio: 9.42

| | Wide-angle end | Middle focal Length | Telephoto end |
|---|---|---|---|
| Focal Length | 6.69 | 17.74 | 63.03 |
| F-number | 3.10 | 3.87 | 5.54 |
| Angle of View | 30.08 | 12.32 | 3.52 |
| Image Height | 3.88 | 3.88 | 3.88 |
| Lens Total Length | 83.19 | 84.27 | 88.72 |
| BF | 5.12 | 10.34 | 4.02 |
| d5 | 0.75 | 7.33 | 15.29 |
| d11 | 9.86 | 4.36 | 0.81 |
| d13 | 1.20 | 1.20 | 1.20 |
| d15 | 14.05 | 4.87 | 0.50 |
| d22 | 2.66 | 2.78 | 2.95 |
| d24 | 9.44 | 13.27 | 23.82 |
| d27 | 5.12 | 10.34 | 4.02 |
| Entrance Pupil Position | 19.01 | 40.12 | 119.74 |
| Exit Pupil Position | −35.90 | −54.90 | −314.68 |
| Front Principal Point Position | 24.61 | 53.03 | 170.31 |
| Rear Principal Point Position | −1.57 | −7.40 | −59.01 |

Zoom Lens Unit Data

| Lens Unit | First Surface | Focal Length | Lens Configuration Length | Front Principal Point Position | Rear Principal Point Position |
|---|---|---|---|---|---|
| 1 | 1 | 31.08 | 8.07 | 1.65 | −3.17 |
| 2 | 6 | −7.78 | 6.61 | 0.75 | −4.32 |
| PR | 12 | ∞ | 8.75 | 2.39 | −2.39 |
| 3 | 14 | −171.20 | 0.50 | 0.51 | 0.17 |
| 4 | 16 | 14.54 | 12.59 | 5.79 | −7.71 |
| 5 | 23 | −28.21 | 0.55 | −0.52 | −0.85 |
| 6 | 25 | 35.54 | 3.04 | −0.18 | −1.94 |

Single Lens Data

| Lens | First Surface | Focal Length |
|---|---|---|
| 1 | 1 | −56.91 |
| 2 | 2 | 40.55 |

-continued

Numerical Example 5
Unit: mm

| | | |
|---|---|---|
| 3 | 4 | 38.08 |
| 4 | 6 | −8.91 |
| 5 | 8 | −13.49 |
| 6 | 10 | 16.96 |
| 7 | 12 | 0.00 |
| 8 | 14 | −171.20 |
| 9 | 16 | 11.02 |
| 10 | 18 | −15.16 |
| 11 | 21 | 18.26 |
| 12 | 23 | −28.21 |
| 13 | 25 | 21.42 |
| 14 | 26 | −51.45 |

TABLE 1

| Numerical Example | Condition | | | | |
|---|---|---|---|---|---|
| | (1) | (2) | (3) | (4) | (5) |
| 1 | 1.27 | 0.00 | 0.85 | 0.036 | 2.52 |
| 2 | 1.27 | 0.00 | 0.76 | 0.172 | 2.52 |
| 3 | 1.70 | −0.01 | 1.12 | 0.171 | 2.56 |
| 4 | 1.50 | −0.38 | 0.83 | 0.208 | 2.29 |
| 5 | 1.51 | −0.27 | 0.71 | 0.085 | 2.50 |

In each exemplary embodiment of the present invention, the prism PR is used as the reflection unit. However, the present exemplary embodiment is not limited to this. More specifically, a mirror is used instead of the prism PR. In addition, it is also useful if the second lens unit L2 includes one negative lens. Furthermore, it is also useful if the second lens unit L2 includes two or more positive lenses.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2008-295807 filed Nov. 19, 2008 and No. 2009-208194 filed Sep. 9, 2009, which are hereby incorporated by reference herein in their entirety.

What is claimed is:

1. A zoom lens comprising, in order from an object side to an image side:
    a first lens unit having a positive refractive power;
    a second lens unit having a negative refractive power;
    a reflection unit including a reflection surface for bending an optical path,
    a third lens unit having a negative refractive power;
    a fourth lens unit having a positive refractive power; and
    a fifth lens unit having one of a positive refractive power and a negative refractive power,
    wherein during zooming from a wide-angle end to a telephoto end, at least the second lens unit and the fourth lens unit move while the reflection unit remains stationary, and
    wherein a focal length of the first lens unit (f1) and focal lengths of the zoom lens at the wide-angle end and at the telephoto end (fw, ft) satisfy the following condition:

$0.7 < f1/\sqrt{fw \cdot ft} \leq 1.7$.

2. The zoom lens according to claim 1, wherein an amount of movement of the first lens unit (M1) during zooming from the wide-angle end to the telephoto end satisfies the following condition:

$-0.5 < M1/\sqrt{fw \cdot ft} < 0.2$.

3. The zoom lens according to claim 1, wherein a focal length of the fourth lens unit (f4) satisfies the following condition:

$0.4 < f4/\sqrt{fw \cdot ft} < 1.5$.

4. The zoom lens according to claim 1, wherein a focal length of the fourth lens unit (f4) and a focal length of the third lens unit (f3) satisfy the following condition:

$0.0 < |f4/f3| < 0.4$.

5. The zoom lens according to claim 1,
    wherein the second lens unit includes at least one negative lens and at least one positive lens, and
    wherein respective average Abbe numbers of the at least one negative lens and the at least one positive lens (vn, vp) satisfy the following condition:

$1.5 < vn/vp < 5.0$.

6. The zoom lens according to claim 1, wherein when the zoom lens is retracted, the first lens unit and the second lens unit are moved into a space generated by moving the reflection unit.

7. A camera comprising:
    the zoom lens according to claim 1; and
    a photoelectric conversion element configured to receive an image formed by the zoom lens.

* * * * *